United States Patent
Zehavi et al.

(10) Patent No.: US 9,491,610 B2
(45) Date of Patent: Nov. 8, 2016

(54) METHOD AND APPARATUS FOR INTRA-NETWORK ROAMING FOR IP TELEPHONY NETWORK

(71) Applicant: VONAGE AMERICA INC., Holmdel, NJ (US)

(72) Inventors: Boaz Zehavi, Jersey City, NJ (US); Soheil Karshenas Najafabadi, Kew Gardens, NY (US); Jaya Meghani, Old Bridge, NJ (US)

(73) Assignee: VONAGE AMERICA INC., Homdel, NJ (US)

( * ) Notice: Subject to any disclaimer, the term of this patent is extended or adjusted under 35 U.S.C. 154(b) by 0 days.

(21) Appl. No.: 14/291,566

(22) Filed: May 30, 2014

(65) Prior Publication Data

US 2015/0350868 A1 Dec. 3, 2015

(51) Int. Cl.
*H04W 4/00* (2009.01)
*H04W 8/02* (2009.01)
(Continued)

(52) U.S. Cl.
CPC ............. *H04W 8/02* (2013.01); *H04M 1/2535* (2013.01); *H04W 60/04* (2013.01); *H04W 8/12* (2013.01); *H04W 8/26* (2013.01)

(58) Field of Classification Search
CPC ....... H04W 8/26; H04W 12/06; H04W 8/06; H04W 4/24; H04W 4/001; H04W 4/003; H04W 8/04; H04W 8/12; H04W 8/183; H04W 60/00; H04W 8/10; H04W 8/18; H04W 48/18; H04W 60/04; H04W 64/00; H04W 8/02
USPC ............................................... 455/432.1–464
See application file for complete search history.

(56) References Cited

U.S. PATENT DOCUMENTS 5,745,850 A 4/1998 Aldermeshian et al.
6,088,126 A 7/2000 Khouri et al.
(Continued)

FOREIGN PATENT DOCUMENTS

WO WO 2013075873 A1 * 5/2013 ........... H04Q 3/0045

OTHER PUBLICATIONS

International Search Report issued in PCT/US2012/071248 on Oct. 4, 2013.
(Continued)

*Primary Examiner* — Ronald Eisner
(74) *Attorney, Agent, or Firm* — Nixon & Vanderhye P.C.; Joseph Pagnotta

(57) ABSTRACT

A method of operating an internet-based telephony system (20) comprises determining that a telephony device (30) associated with a customer has access to service to the internet-based telephony system (20); and sending a location update signal to a public land mobile network (32) associated with the customer. The location update signal is configured to include an identification of the internet-based telephony system (20) as a network visited by the telephony device (30) associated with the customer. Upon the internet-based telephony system (20) receiving from the public land mobile network (32) an indication of an incoming communication directed to a called number associated with an account of the customer which includes the telephony device (30), the method further includes the internet-based telephony system (20) providing the public land mobile network (32) with a roaming number for the telephony device, and upon receiving the incoming communication and the roaming number from the public land mobile network (32), routing the communication through the Internet to a device included in the customer's account.

19 Claims, 15 Drawing Sheets

(51) Int. Cl.
*H04M 1/253* (2006.01)
*H04W 60/04* (2009.01)
*H04W 8/12* (2009.01)
*H04W 8/26* (2009.01)

(56) References Cited

U.S. PATENT DOCUMENTS

| | | |
|---|---|---|
| 6,615,037 B1 | 9/2003 | Bharatia et al. |
| 7,116,975 B1 | 10/2006 | Link et al. |
| 7,379,436 B2 | 5/2008 | Jiang |
| 7,551,920 B1 | 6/2009 | Ngan |
| 7,885,657 B2 | 2/2011 | Bicker |
| 7,990,912 B2 | 8/2011 | Nix et al. |
| 8,139,753 B2 | 3/2012 | Pickering et al. |
| 8,571,060 B2 | 10/2013 | Fighel |
| 8,600,364 B2 | 12/2013 | Fighel |
| 8,693,994 B2 | 4/2014 | Fighel |
| 8,744,422 B2 | 6/2014 | Fighel |
| 8,855,612 B2 | 10/2014 | Fighel et al. |
| 8,862,109 B2 | 10/2014 | Fighel |
| 8,934,882 B2 | 1/2015 | Fighel et al. |
| 8,958,785 B2 | 2/2015 | Fighel |
| 8,989,721 B2 | 3/2015 | Fighel |
| 9,002,335 B2 | 4/2015 | Fighel |
| 9,002,336 B2 | 4/2015 | Fighel |
| 9,020,477 B2 | 4/2015 | Fighel |
| 9,020,478 B2 | 4/2015 | Fighel |
| 2001/0040954 A1 | 11/2001 | Brachman et al. |
| 2003/0003900 A1 | 1/2003 | Goss et al. |
| 2004/0076140 A1 | 4/2004 | Begeja et al. |
| 2004/0248563 A1 | 12/2004 | Ayers et al. |
| 2007/0015536 A1 | 1/2007 | Labauve et al. |
| 2007/0064682 A1 | 3/2007 | Adams et al. |
| 2007/0076665 A1 | 4/2007 | Nair |
| 2007/0121580 A1 | 5/2007 | Forte et al. |
| 2007/0167167 A1 | 7/2007 | Jiang |
| 2007/0274485 A1 | 11/2007 | Garrison |
| 2008/0039080 A1 | 2/2008 | Bertagnole et al. |
| 2008/0075261 A1 | 3/2008 | Ramanathan et al. |
| 2008/0153480 A1 | 6/2008 | Jiang |
| 2008/0244148 A1 | 10/2008 | Nix et al. |
| 2009/0061821 A1* | 3/2009 | Chen ............... H04W 60/00 455/411 |
| 2009/0092093 A1 | 4/2009 | Wu |
| 2009/0116636 A1 | 5/2009 | Pickering et al. |
| 2009/0141882 A1 | 6/2009 | Baeza |
| 2010/0124323 A1 | 5/2010 | Herndon et al. |
| 2011/0075675 A1* | 3/2011 | Koodli ............... H04L 12/14 370/401 |
| 2011/0096771 A1 | 4/2011 | Saru et al. |
| 2013/0005308 A1 | 1/2013 | Wouterse |
| 2013/0059574 A1 | 3/2013 | Fighel et al. |

OTHER PUBLICATIONS

Written Opinion issued in PCT/US2012/071248 on Oct. 4, 2013.
"3rd Generation Partnership Project; Technical Specification Group Core Network and Terminals; Call Forwarding (CF) supplementary services; Stage 2 (Release 11)", 3GPP Standard; 3GPP TS 23.082, 3rd Generation Partnership Project (3GPP), Mobile Competence Centre; 650, Route Des Lucioles, F-06921 Sophia-Antipolis Cedex; France, vol. CT WG4, No. V11.0.0, Dec. 17, 2011 (Dec. 17, 2011), pp. 1-86, XP050554577, [retrieved on Dec. 17, 2011] paragraphs [000 1] - [0 1. 2]; figures 1.1, 1.11.
Anonymous: "Easy Call Forwarding App" Android Forums, Dec. 2, 2010 (Dec. 2, 2010) pp. 1-4, XP055066320, Retrieved from the Internet: URL:http://androidforums.com/android-applications/7380-easy-call-forwarding-app.html [retrieved on Jun. 12, 2013] the whole document.
Rosenberg et al., SIP: Session Initiation Protocol, Internet Engineering Task Force, RFC 3261, Jun. 2002, 269 pages.
Dierks et al., The Transport Layer Security (TLS) Protocol, version 1.2, Network Working Group, RFC 5246, Aug. 2008, 105 pages.
Jonsson et al., Public-Key Cryptography Standards (PKCS) #1: RSA Cryptography Specifications, version 2.1, Network Working Group, RFC 3447, Feb. 2003, 72 pages.
"Advance Encryption Standard" (AES), Federal Information Processing Standards Publication 197, Nov. 26, 2001, 51 pages.
Call Forwarding; Wikipedia, the free encyclopedia; Dec. 11, 2012; pp. 1-5.
How to Forward Calls on the iPhone and any other ATT cell phone—Know Your Cell; Dec. 11, 2012; pp. 1-2.
"3rd Generation Partnership Project; Technical Specification Group Services and System Aspects; Voice Call Continuity (VCC) between Circuit Switched (CS) and IP Multimedia Subsystem (IMS); Stage 2 (Release 7) "3GPP TS 23.206. 3rd Generation Partnership Project (3GPP). Mobile Competence Centre; 650. Route Des Lucioles; F-06921 Sophia-Antipolis Cedex; France No. V7.5.0. Dec. 1, 2007 (Dec. 1, 2007). pp. 1-36. XP050363131. paragraphs [0005] - [05.2]; figure 5.1 paragraph [6.5.2.3] paragraphs [Annex:A] - [Annex:A.1].
Office Action issued in U.S. Appl. No. 13/334,849 on Mar. 16, 2012.
Office Action issued in U.S. Appl. No. 13/492,361 on Jul. 20, 2012.
Office Action mailed Aug. 11, 2015 in U.S. Appl. No. 13/668,826.
Notice of Allowance mailed Nov. 24, 2015 in U.S. Appl. No. 13/668,826.
Notice of Allowance mailed Jan. 12, 2016 in U.S. Appl. No. 13/668,826.
Office Action mailed Mar. 7, 2016 in U.S. Appl. No. 13/668,826.
Notice of Allowance mailed Jun. 20, 2016 in U.S. Appl. No. 13/668,826.

* cited by examiner

METHOD AND APPARATUS FOR INTRA-NETWORK ROAMING FOR IP TELEPHONY NETWORK

TECHNICAL FIELD

The technology relates to telecommunications, and in particular to Internet Protocol (IP) telephone systems that are accessible to mobile telephony devices.

BACKGROUND

An Internet Protocol (IP) telephony system routes various types of communications, at least in part, via data packets that are communicated over a data network. The data network is commonly the Internet. The types of communications may be, for example, telephone calls, video calls, text and video messages, and other forms of telephony and data communications. The users of the Internet Protocol (IP) telephony system typically gain access to the Internet using an Internet service provider so that they can communicate via the IP telephony system.

Some users or customers of the IP telephony system may engage in communications using telephony devices that are connected by physical lines such as cables or wires to an access point such as an internet port. Such wired telephony devices may, thanks to the services of the IP telephony system, be moved from one physical location to another physical location, but at each such physical location are physically connected in a wired manner to the respective access point.

Other users or customers of the IP telephony system may possess mobile or wireless telephony devices, such as a wireless terminal, user equipment (UE), mobile phone, smart phone, or laptop, tablet, or other device with mobile termination. When such a mobile telephony device is within coverage of an appropriate wireless network (e.g., WiFi or WiMax network) that has connection to the a data network such as the Internet, the communications involving the mobile telephony device may be handled by the IP telephony system in conjunction with the wireless network. In other words, the communications may occur wirelessly between the mobile telephony device and a wireless access point of the wireless network, with the wireless access point in turn being connected to an Internet portal. Access in this manner to the Internet portal enables the mobile telephony device to capitalize upon the service of the IP telephony system in economically routing the communications through the Internet, rather than over existing non-Internet service carriers.

When a mobile telephony device is not in range of a wireless network to gain the benefit of the IP telephony system, the mobile telephony device may instead be served by other carriers and/or services using one or more mobile radio access networks. Such mobile radio access networks typically comprise plural base stations which have both radio frequency transmitting and receiving capabilities to serve macro cells. A macro cell is essentially defined by the extent of the transmitting and receiving capabilities of the base station. The mobile telephony devices located within the cell may communicate with the radio access network through the base station (unless the customer also happens to be within range of another wireless network, such as a WiFi or WiMax wireless network or the like, and exercises the option to use the other wireless network instead of the radio access network). In some instances such a "macro" base station may be called a "radio base station", "base station", NodeB, eNodeB, or the like.

Many radio access networks allow a mobile telephony device to roam from cell to cell, either within the same radio access network and radio access technology, or even to roam between cells of differing radio access network and/or radio access technologies. Such roaming between macro cells and technologies of radio access networks typically involves an operation or procedure known as "location update", or some similar operation.

Consider, for example, a scenario in which a user of a mobile telephony device, having a home carrier in the United States of America, travels to China with the mobile telephony device. When the mobile telephony device is turned on in China, a switch or other element in a Chinese mobile network detects activation of the mobile telephony device. As a result, the Chinese mobile network sends a location update type message to a home location register (HLR) of the American home carrier. The location update message informs the American home carrier that the mobile telephony device is now within service of the Chinese mobile network, so that the American home carrier should transfer all incoming calls directed to the mobile telephony device to the Chinese mobile network. Thereafter, when a new call is placed to the mobile telephony device (now in China), any such new call, regardless of location of origination, is initially directed to the American home carrier. Upon receipt of the new incoming call to the mobile telephony device the American home carrier checks its home location register and thus determines that the mobile telephony device is now serviced by the Chinese mobile network. Accordingly, the American home carrier sends a message to the Chinese mobile network, asking for a registration number (a temporary telephone number assigned by the Chinese mobile network to the mobile telephony device) recognizable by the Chinese mobile network for the mobile telephony device now serviced in China. Upon receiving from the Chinese mobile network the Chinese-provided registration number for the mobile telephony device, the American carrier transfers the incoming call using the Chinese-provided registration number to the Chinese mobile network. In this manner the Chinese mobile network recognizes the transferred incoming call to the mobile telephony device, and can route the transferred incoming call through the Chinese mobile network to the mobile telephony device.

The location update procedure described above applies to roaming mobile telephony devices that are served by non-IP telephony systems. Both IP telephony systems and non-IP telephony systems both provide an additional service known as call forwarding. In a call forwarding service, incoming calls to a customer's nominal directory number are instead routed to an alternate number specified by the customer. Such alternate number may be stored in a home location register or the like maintained by the home carrier network. The call forwarding service may be available both to wired and wirelessly connected telephony devices. Examples of how call forwarding services may be beneficially used by mobile/wireless telephony devices are described in one or more of the following United States patent applications, all of which are incorporated herein by reference: U.S. Pat. No. 8,600,364; U.S. patent application Ser. Nos. 13/492,361; 13/562,542; 13/568,416; 13/597,396; 13/597,916; 13/668,826; 13/671,006; 13/673,043; 13/649,847; 13/671,162; 13/597,485; and 13/669,009.

When call forwarding is to be utilized for a mobile telephony device, the customer or subscriber may input a string of numbers, e.g., a code such as "#21*xxx*" (wherein "xxx" is the call forwarding number to be used upon implementation of the call forwarding operation). The input of code a code results in a signal being transmitted to the home carrier that informs the home carrier to start forwarding calls to the number specified in the string (or a number pre-stored with the home carrier) instead of the nominal directory number associated with the wireless telephony device.

In some instances the forwarding number may be a number associated with an IP telephony system, e.g., a server of an IP telephony system. Thereafter, the IP-telephony system may terminate the call over the IP telephony system network to the subscriber when the subscriber is in range of an appropriate internet-connected wireless network, such as Wi-Fi. The call forwarding service is thus implemented at the time of conscious, deliberate activation of the customer/subscriber, and remains in effect until the call forwarding service is removed by a similar conscious, deliberate act of the customer/subscriber. In essence, the call forwarding number remains permanently applied until specifically replaced by the customer/subscriber. Thus, prior art call forwarding services do not effectively cater to the roaming of mobile telephony devices.

SUMMARY

In one of its aspects the technology disclosed herein concerns a method of operating an internet-based telephony system. In a basic exemplary embodiment and mode the method comprises determining that a telephony device associated with a customer of the telephony system has access to service to the internet-based telephony system; and sending a location update signal to a public land mobile network associated with the customer. The location update signal is configured to include an identification of the internet-based telephony system as a network visited by the telephony device associated with the customer. Upon the internet-based telephony system receiving from the public land mobile network an indication of an incoming communication directed to a called number associated with an account of the customer which includes the telephony device, the method further includes the internet-based telephony system providing the public land mobile network with a roaming number, and upon receiving the incoming communication from the public land mobile network, the internet-based telephony system routing the communication through the Internet to a device included in the customer's account.

In an exemplary embodiment and mode, the device included in the customer account may be the telephony device. In another exemplary embodiment and mode, the device included in the customer account may be a device other than the telephony device.

In an exemplary embodiment and mode, the method further comprises sending the location update signal to a home location register of the public land mobile network associated with the customer. The location update signal being is configured by the telephony system to include information that enables the home location register of the home location network to register the internet-based telephony system as the network visited by the telephony device associated with the customer.

In an exemplary embodiment and mode, the telephony device is a wireless telephony device, and the method further comprises determining when the telephony device is wirelessly connected for service to the internet-based telephony system.

In an exemplary embodiment and mode, the method comprises determining when the telephony device is wirelessly connected through a WiFi access point for service to the internet-based telephony system.

In an exemplary embodiment and mode, the method comprises determining when the telephony device is wirelessly connected through a data-connection handling macro network for service to the internet-based telephony system.

In an exemplary embodiment and mode, the method further comprises configuring the wireless telephony device, when the telephony device is wirelessly connected for service to the internet-based telephony system, to refrain from sending a location update to the public land mobile network associated with the customer through a radio access network.

In an exemplary embodiment and mode, the method further comprise configuring the location update signal to include a Global Title address of the internet-based telephony system.

In an exemplary embodiment and mode, the method further comprises configuring and sending the location update signal in accordance with GSM 09.02 standards.

In another of its aspects the technology disclosed herein concerns an internet-based telephony system. The internet-based telephony system comprises a processor configured to generate location update signaling to include an identification of the internet-based telephony system as a network visited by a mobile telephony device associated with an account of a customer of the telephony system when the telephony device has access to service of the internet-based telephony system. The processor is also configured when, as a result of the location update signaling, the home location network directan incoming communication for a called number associated with the account for the customer to the internet-based telephony system, to route the incoming communication through the Internet to a device included in the account for the customer.

In an exemplary embodiment and mode, the device included in the customer account may be the telephony device. In another exemplary embodiment and mode, the device included in the customer account may be a device other than the telephony device.

In an exemplary embodiment the internet-based telephony system further comprises an access monitor; a signal generator; a gateway; a signal handler; and a communication connection unit. The access monitor is configured to obtain information for the telephony device associated with the customer when the telephony device has access to service to the internet-based telephony system. The signal generator is adapted, when the telephony device has access to service to the internet-based telephony system, to configure the location update signal to cause the home location network for the customer to register the internet-based telephony system as a network visited by a telephony device associated with the customer. The gateway is configured to send the location update signal to the home location network and to receive a roaming number request signal and an incoming communication routing signal from the home location network. The signal handler is configured, upon receipt of the roaming number request signal, to provide the home location network with a roaming number configured to cause the home location network to route the incoming communication as an incoming communication routing signal to the internet-based telephony system. The communication connection unit is configured, upon receipt of the incoming communication routing signal, to route the communication through the Internet to the telephony device.

In an exemplary embodiment, the internet-based telephony system further comprises a location register database configured to store the roaming number and the IP address for the telephony device.

In an exemplary embodiment the processor is configured to generate the location update signal to include a Global Title address of the internet-based telephony system.

In an exemplary embodiment and mode, the incoming communication is one of an incoming voice call and a short message service communication.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1A:
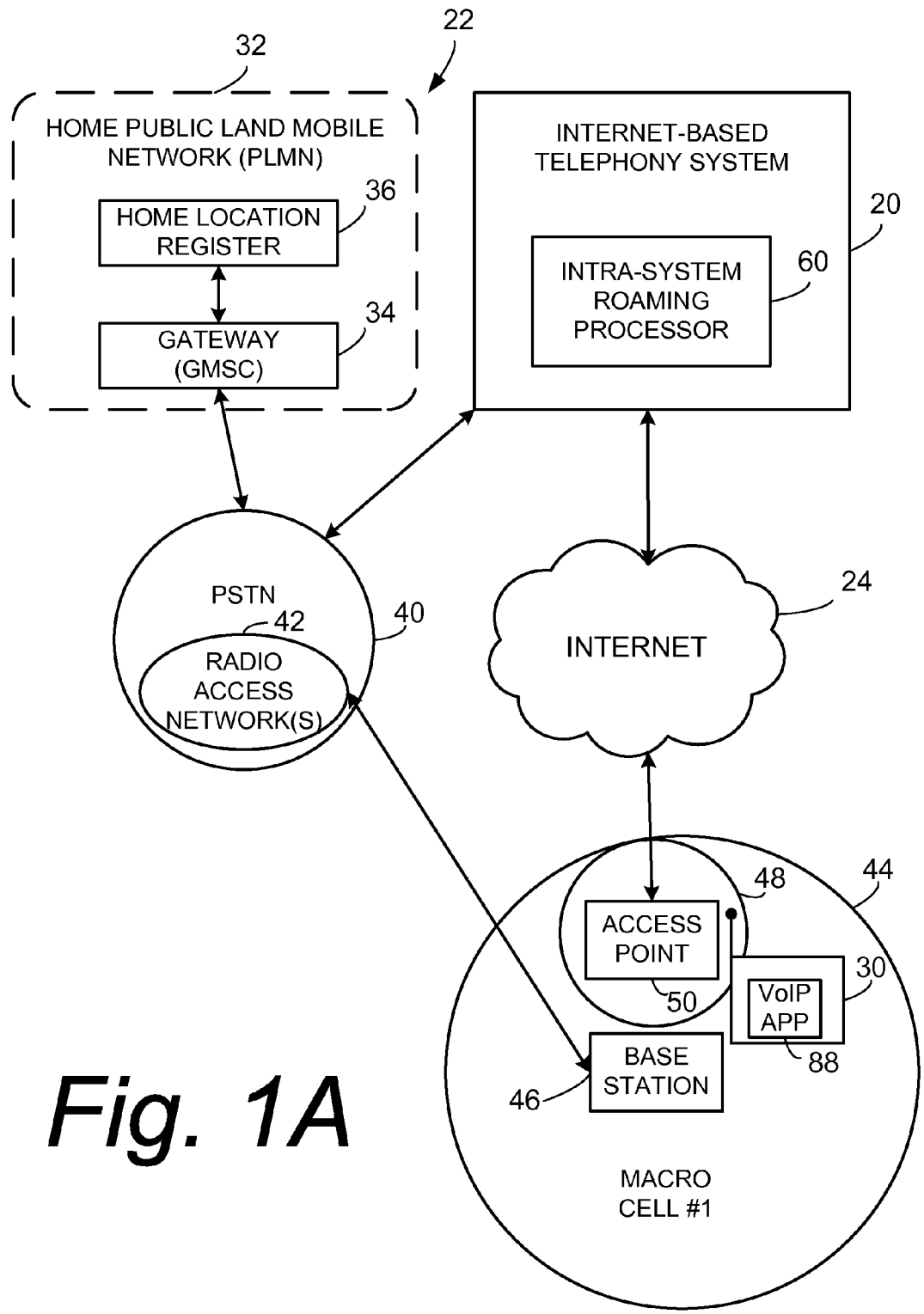
FIG. 1A is a diagrammatic view of a communications network comprising an Internet-based telephony system which facilitates intra-system roaming, showing location/situation of a telephony device in a first roaming position.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

In the following description, the terms "VoIP system", "VoIP telephony system", "IP system" and "IP telephony system" are all intended to refer to a system that connects callers and that delivers data, text and video communications using Internet protocol data communications.

The following description will refer to "telephony communications". The term "telephony communications" is intended to encompass any type of communication that could pass back and forth between users of an IP telephony system. This includes audio and video telephone, text messages such as short message service (SMS) communications, video messages and any other form of telephony or data communication.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an Apple iPhone™, a RIM Blackberry or a comparable device running Google's Android operating system could be a mobile telephony device.

In still other instances, a mobile telephony device may be a device that is not traditionally used as a telephony device, but which includes a wireless data transceiver that can establish a wireless data connection to a data network. Examples of such devices include the Apple iPod Touch™ and the iPad™. Such a device may act as a mobile telephony device once it is configured with appropriate application software.

FIG. 1A shows a telephony system 20, in context of an exemplary generic communications system 22. In view of the fact that the telephony system 20 may be an Internet (IP) telephony system, the telephony system 20 is shown as connected to a data communications network such as Internet 24. A telephony device 30, which for sake of illustration happens to be a mobile or wireless telephony device such as a user equipment unit, smart phone, or laptop with mobile termination, for example, is associated with a customer of the telephony system 20.

The customer is not only a customer of telephony system 20, but is also served by the customer's home public land mobile network (PLMN) 32. The customer's home public land mobile network 32 is shown in FIG. 1A as comprising a PLMN gateway or switching center (GMSC) 34, as well as a PLMN home location register (HLR) 36.

Both home public land mobile network 32 and telephony system 20 are connected to the public switched telephone network (PSTN) 40. The public switched telephone network (PSTN) 40 may comprise one or more radio access network(s) (RANs) 42. The home public land mobile network 32 is connected to public switched telephone network (PSTN) 40 through the PLMN gateway 34. Telephony system 20 is also connected to public switched telephone network (PSTN) 40 through its gateway(s), described hereinafter.

FIG. 1A further shows telephony device 30 as being situated in a radio access network cell 44 which is served by base station 46 of a radio access network 42. The base station 46 may be a base station controller (BSC), NodeB, eNodeB, or other type of base station. As such, the network cell 44 may be referred to as a macro cell and the base station 46 as a macro base station. Typically macro base stations such as macro base station 46 communicate with wireless terminals using using licensed frequencies.

It will be appreciated that some macro base stations belong to networks which have data connection handling capability while other base stations belong to networks that do not have data connection handling capability. The former networks provide services such as call service and short message service (SMS), and typically include base stations which report to a radio network controller node and which may belong to a roaming area. The former networks additionally provide General Packet Radio Service (GPRS)/3G/LTE services and typically include base stations characterized as NodeB or eNodeB and for which routing areas are defined. The base stations of both types of networks broadcast their roaming and routing area.

FIG. 1A also shows telephony device 30 as being within a smaller cell 48 (e.g., a micro cell, home cell, pico cell, or femto cell) which is served by a wireless access point 50 of an internet-connected wireless access service. The access point 50 may provide Wi-Fi or WiMAX access to telephony device 30. Wi-Fi is a technology that allows an electronic device to exchange data or connect to the Internet wirelessly using microwaves in the 2.4 GHz and 5 GHz bands, and thus includes any "wireless local area network (WLAN) products that are based on the Institute of Electrical and Electronics Engineers' (IEEE) 802.11 standards". The smaller cell 48 may also be referred to as an access point cell. Typically access points such as access point 50 communicate with wireless terminals using unlicensed frequencies.

The telephony system 20 comprises intra-system roaming processor 60. Although phrased as a processor, intra-system roaming processor 60 may comprise one or more processors, controllers, or servers, either co-located or distributed, that facilitate roaming of telephony device 30 within the territory in which the service of internet-based telephony system 20 is available, e.g., available through co-operation of wireless access points. An example of such an Internet-based telephony system 20 is a voice over IP (VoIP) telephony system. However, in view of the fact that the communications encompassed by the technology described herein is not limited to voice communications, the internet-based telephony system 20 may also be referred to as a "Communication over IP", or "CoIP system". The "intra-system" descriptor signifies that the roaming facilitated by processor 60 is roaming within the territory in which the service of internet-based telephony system 20 is available. In that regard, the intra-system roaming processor 60 may also be referred to as "roaming within CoIP system processor" or, more simply, CoIP roaming processor that implements a "CoIP roaming" feature of the technology disclosed herein.

Figure 1B:
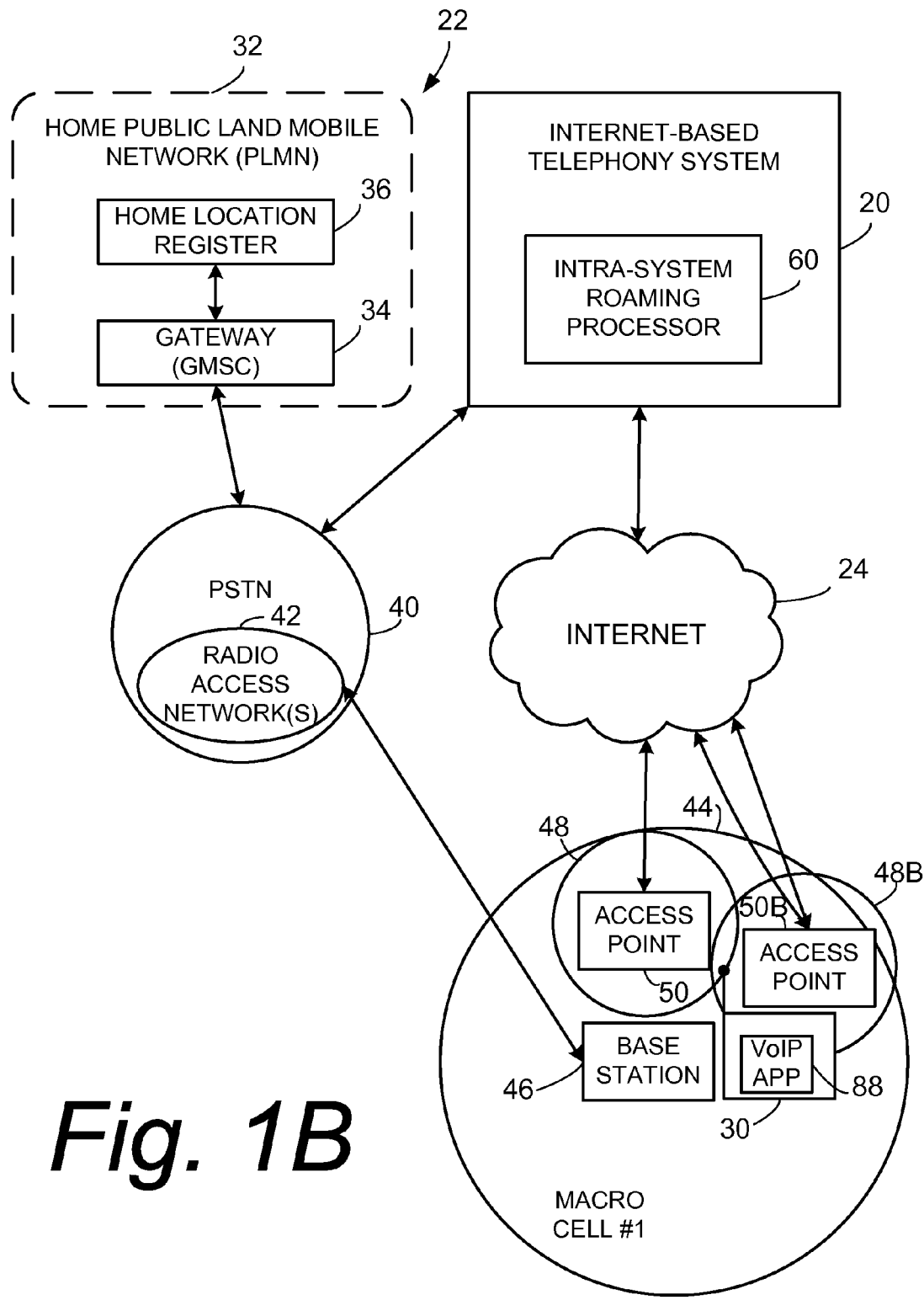
FIG. 1B is a diagrammatic view of the communications network of FIG. 1A, showing further aspects of the network and location/situation of a telephony device in an exemplary second roaming position.
Figure 1C:
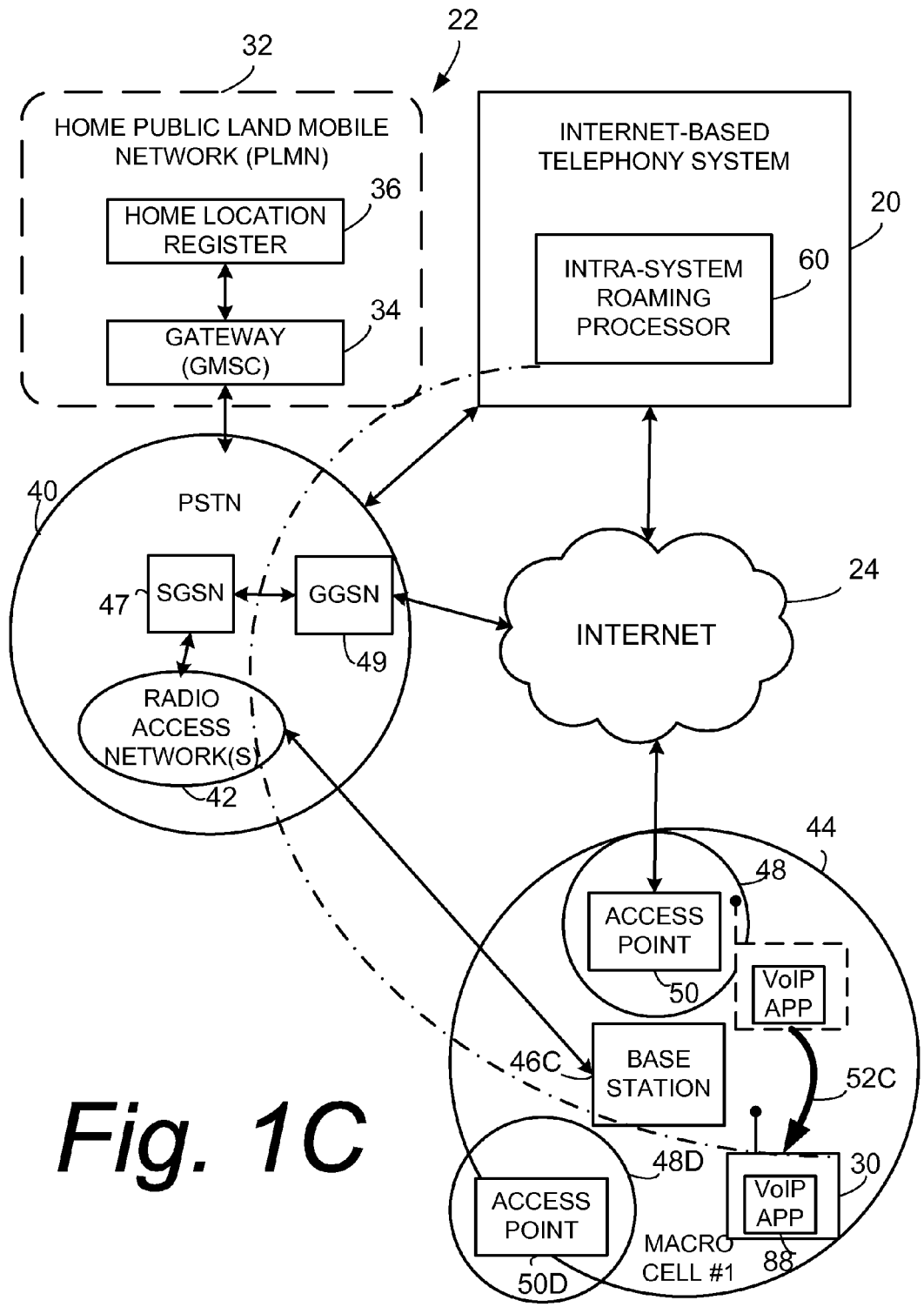
FIG. 1C is a diagrammatic view of the communications network of FIG. 1A, showing further aspects of the network and location/situation of a telephony device in an exemplary third roaming position.
Figure 1D:
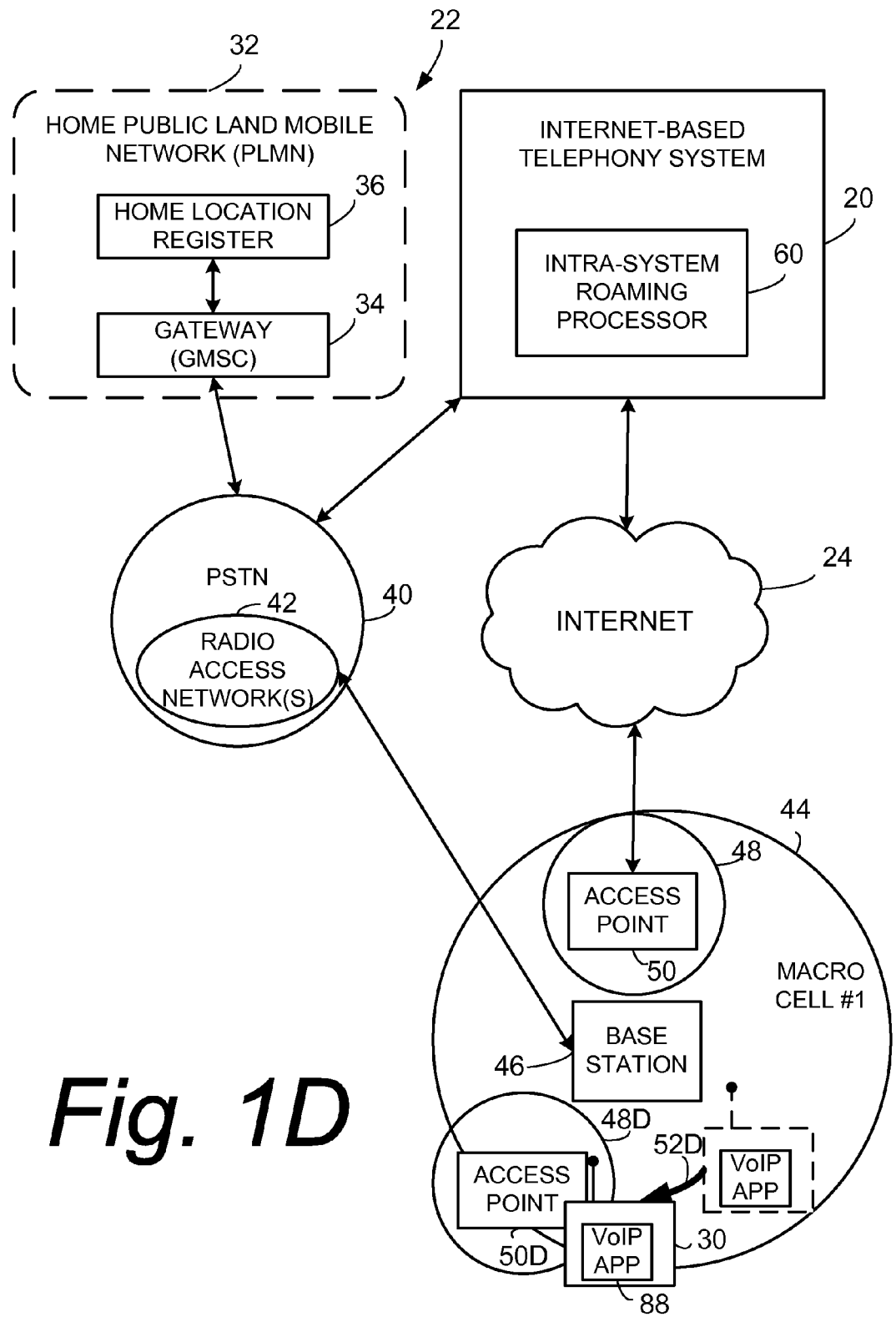
FIG. 1D is a diagrammatic view of the communications network of FIG. 1A, showing further aspects of the network and location/situation of a telephony device in an exemplary fourth roaming position.

Several examples of such intra-system roaming or CoIP roaming are illustrated by comparing FIG. 1A with FIG. 1B, FIG. 1C, and FIG. 1D. FIG. 1B shows a situation in which telephony device 30 has roamed into access point cell 48B of another access point 50B. The cell 48B may also be within the range of macro cell 44, but is situated with respect to original access point cell 48 so that the telephony device 30 may engage in handoff or handover from access point cell 48 to access point cell 48B without having to be served by base station 46, e.g., the telephony device 30 may continually remain within coverage of the access points 50 and 50B and thus stay within "coverage" of internet-based telephony system 20.

FIG. 1C, shows a situation in which telephony device 30 has roamed away from access points such as 50 and 50B (as indicated by roaming direction arrow 52C) and therefore is no longer with in WiFi or WiMax coverage. However, in FIG. 1C the the base station 46C is configured to handle data connections, e.g., is a Node-B or eNodeB type base station which has a data connection such as GPRS/3G/LTE. As such, being within coverage of Node-B base station 46C the telephony device 30 is able to make a data connection through through the licensed frequencies of the base station 46C over the air interface, through appropriate core network nodes such as Serving GPRS Support Node (SGSN) 47 and GPRS Gateway Support Node (GGSN) 49 to internet 24, and through internet 24 to telephony system 20. Thus, although not using the WiFi or unlicensed frequencies, as shown by the dotted-dashed line in FIG. 1C the telephony device 30 still has access through the data services of the macro cell to telephony system 20, and thus remains "in converage" in the situation of FIG. 1C.

FIG. 1D shows by roaming direction arrow 52D that telephony device 30 has roamed from the position of FIG. 1C to again be within coverage of another access point, i.e., access point 50D. FIG. 1D shows telephony device 30 also remaining within coverage of telephony system 20, and in particular again gaining WiFi type coverage.

Figure 1E:
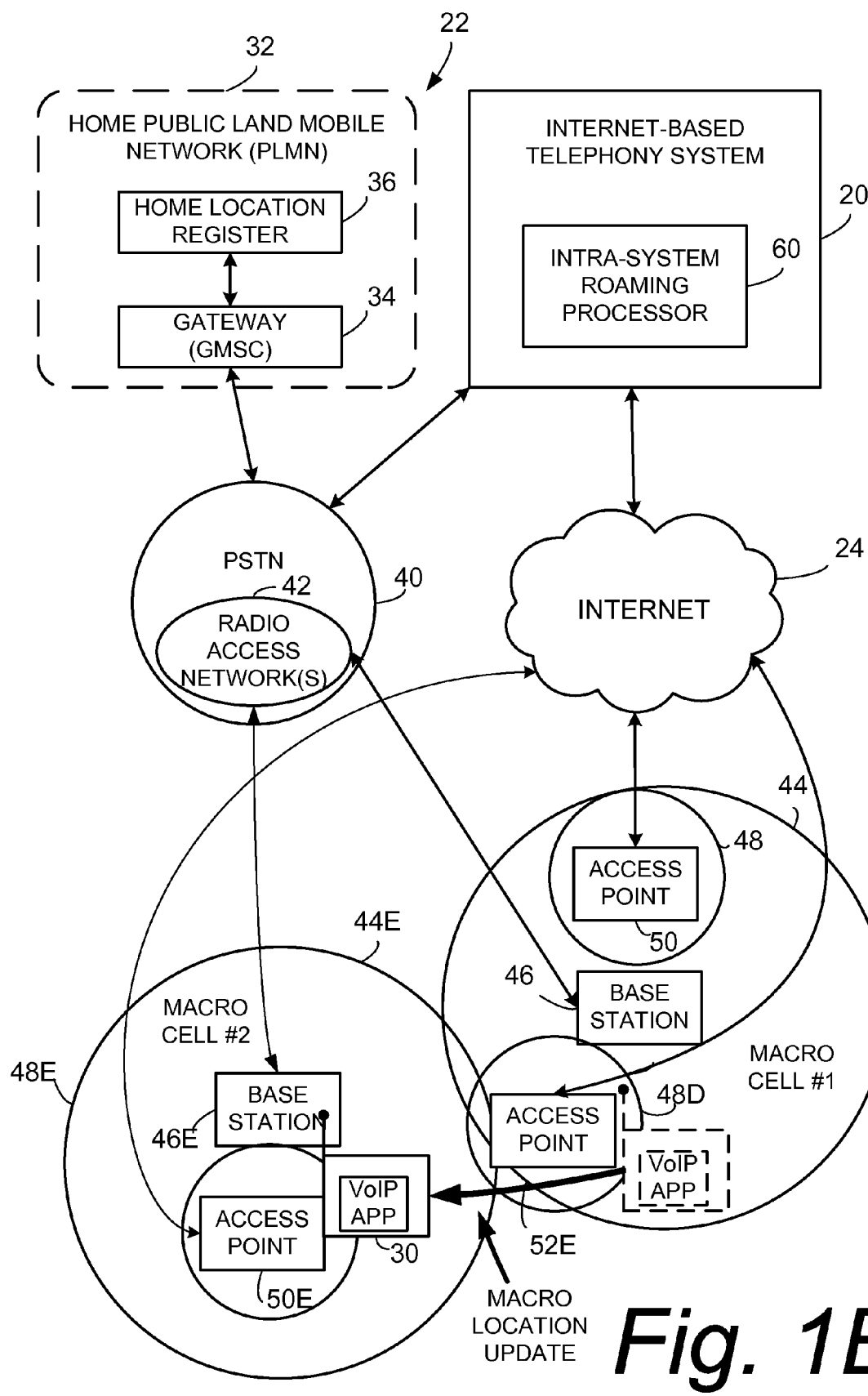
FIG. 1E is a diagrammatic view of the communications network of FIG. 1A, showing further aspects of the network and location/situation of a telephony device in an exemplary fifth roaming position.

FIG. 1E shows by roaming direction arrow 52E that telephony device 30 has from access point cell 48D of access point 50D, into access point cell 48E of access point 50E. The access point cell 48E may also be within the range of yet another macro cell, e.g., macro cell 44E, which is served by base station 46E. In the situation of FIG. 1E the access point cell 48E does not overlap with access point cell 48D, so that during at least a portion of its journey along arrow 52E the telephony device 30 is not covered by an access point with unlicensed frequencies. In such case, if the base station 46E of FIG. 1E is not a data-capable base station, e.g., does not have GPRS/3G/LTE capabilities, the telephony device 30 will be without data connection for a portion of the travel and during such data-less portion make a location update with respect to macro cell 44E. Thus during the data-less portion of the travel depicted by arrow 52E the telephony device 30 may not be within coverage of telephony system 20. However, upon gaining access to access point cell 48E the telephony device 30 may again be within coverage of telephony system 20.

While FIG. 1A-FIG. 1E have illustrated telephony device 30 as being a wireless or mobile telephony device, it should be understood that the technology disclosed herein is not limited to wireless or mobile telephony devices. That is, telephony device connection to the internet-based telephony system 20 is not necessarily a wireless connection. For example, a user can use this roaming service of the presently disclosed technology by installing an application on a computer.

Figure 2:
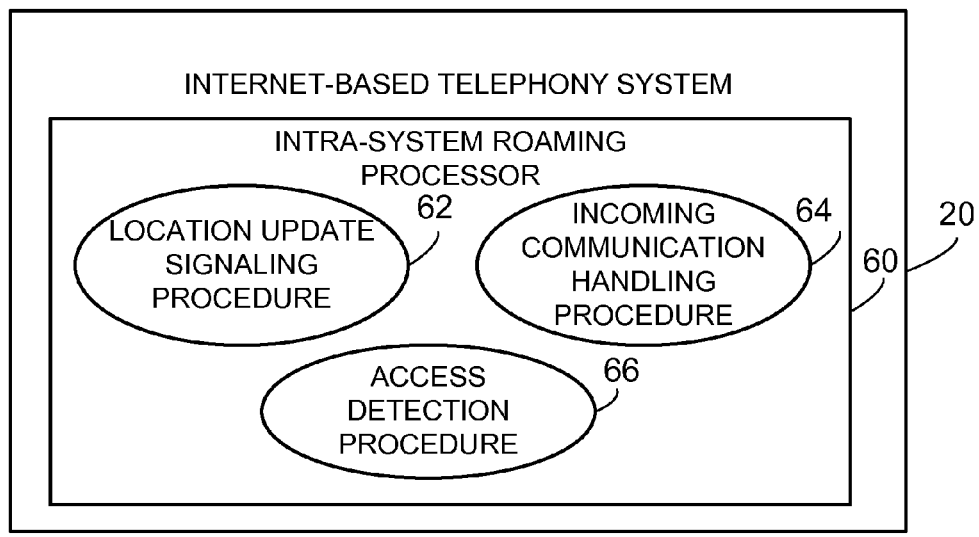
FIG. 2 is a flowchart showing exemplary procedures performed by an intra-system roaming processor according to an exemplary embodiment and mode.
Figure 3:
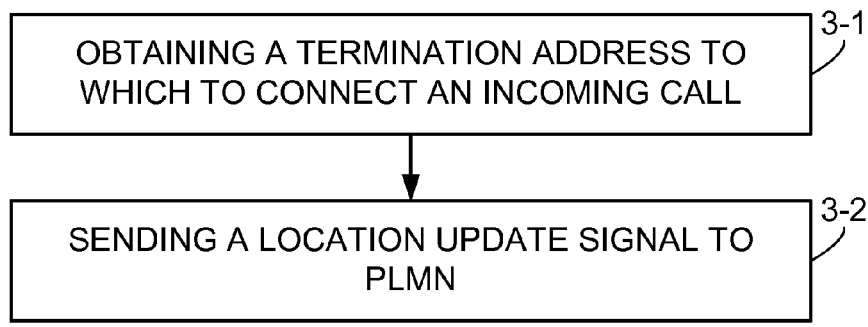
FIG. 3 is a flowchart showing exemplary basic acts or steps comprising an update signaling procedure according to an exemplary embodiment and mode.

As shown in FIG. 2, intra-system roaming processor 60 is involved in at least two separate procedures or operations, both of which facilitate the intra-system or CoIP roaming. A first such procedure, location update signaling procedure 62, comprises generation of location update signaling, and particularly location update signaling which is configured to cause the home location network 32 for the customer to register the internet-based telephony system 20 as a network visited by a mobile telephony device 30. Such generation occurs when telephony device 30 has access to service of the internet-based telephony system. FIG. 3, described further below, shows exemplary basic acts or steps which may comprise update signaling procedure 62. As understood hereinafter, in an exemplary implementation such location update signaling generated by intra-system roaming processor 60 provides PLMN home location register (HLR) 36 with a Global Title (GT) address of telephony system 20. In so doing, the home public land mobile network 32 is notified that telephony device 30 is roaming within an internet-based telephony system.

Figure 4:
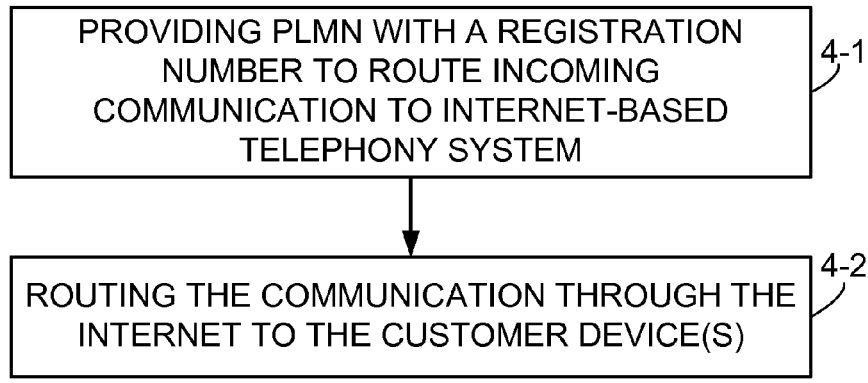
FIG. 4 is a flowchart showing exemplary basic acts or steps comprising an incoming communication handling procedure according to an exemplary embodiment and mode.

FIG. 2 also shows a second procedure or operation, known as incoming communication handling procedure 64. The incoming communication handling procedure 64 is performed by intra-system roaming processor 60 (as a result of previous implementation of the location update signaling) when the home public land mobile network 32 receives an incoming communication, e.g., an incoming call or SMS message for the telephony device 30. FIG. 4, described further below, shows exemplary basic acts or steps which may comprise incoming communication handling procedure 64.

When the home location network 32 directs an incoming communication for the telephony device 30 to the internet-based telephony system 30 as a result of implementation of the location update signaling, the intra-system roaming processor 60 executes the incoming communication handling procedure 64 to cause routing of the incoming communication through the Internet 24 to a device included in an account for the customer. Such device may or may not be the telephony device 30, depending on whether the customer has implemented any features such as call forwarding or ring list or the like.

It was mentioned above that update signaling procedure 62 is performed when telephony device 30 has access to service of the internet-based telephony system. In some exemplary embodiments and modes intra-system roaming processor 60 may detect communications with telephony device 30 through an access point 50, and as a result may automatically execute update signaling procedure 62 upon such detection. In other situations the intra-system roaming processor 60 may detect data communications with telephony device 30 if telephony device 30 receives a broadcast from a data connection-capable (e.g., GPRS type) base station 46, in the manner shown in FIG. 1C. For either situation—licensed frequency data connection through a macro cell as shown in FIG. 1C or unlicensed frequency data connection through a WiFi type access point 50—intra-system roaming processor 60 is shown in FIG. 2 as also optionally performing access detection procedure 66.

It should be understood that one or more, and preferably all, of update signaling procedure 62, incoming communication handling procedure 64, and access detection procedure 66, including actions and contexts described further herein, may be performed as a result of execution by intra-system roaming processor 60 of coded instructions, stored on computer-readable non-transitory media, which comprise the respective procedures. As such, the update signaling procedure 62, incoming communication handling procedure 64, and access detection procedure 66, either singularly or collectively, may comprise a computer program product.

Figure 5:
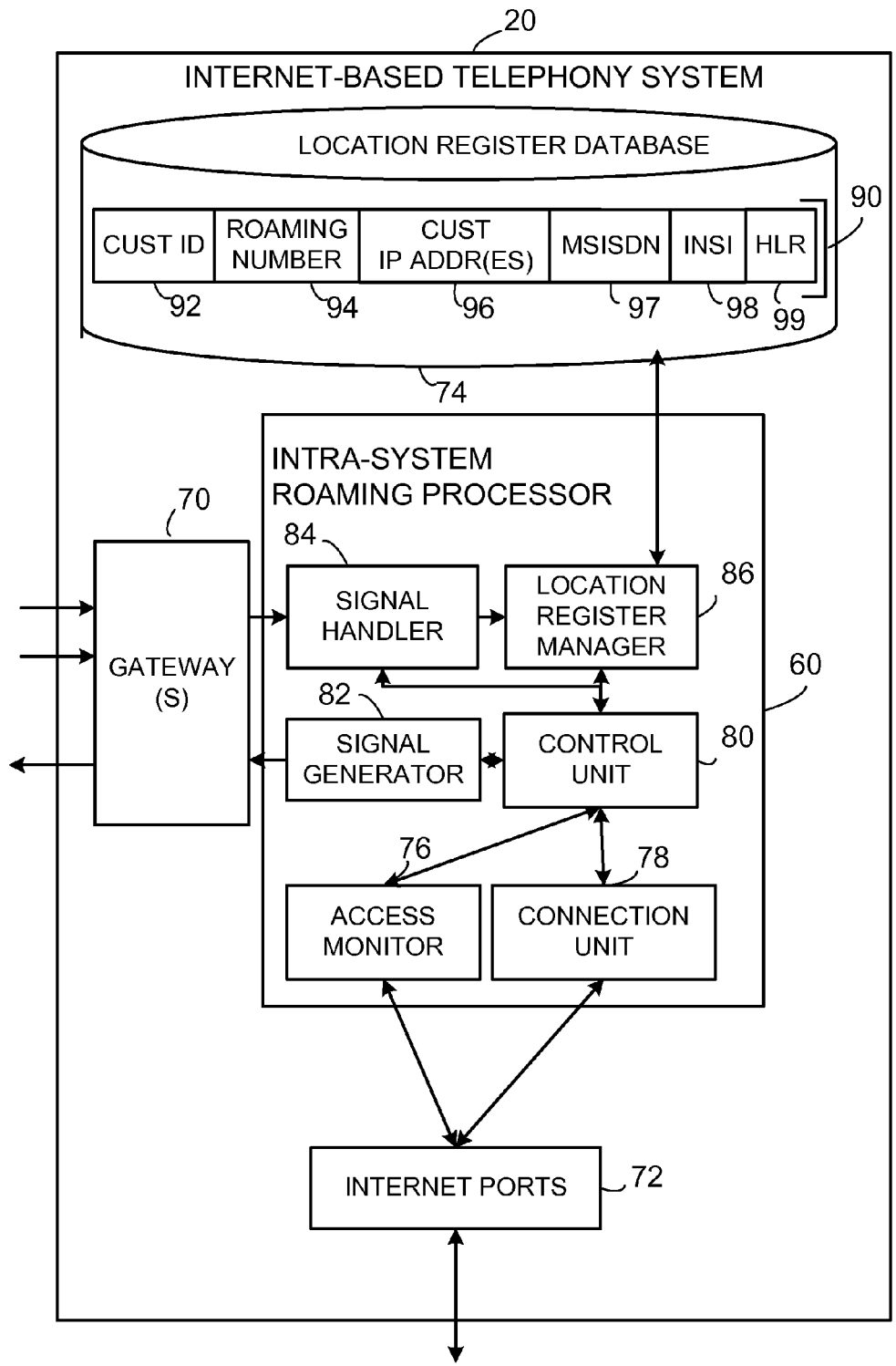
FIG. 5 is a schematic view of an exemplary embodiment of an Internet-based telephony system which facilitates intra-system roaming.

FIG. 5 shows exemplary functionalities and/or units of internet-based telephony system 20, as well as exemplary functionalities and/or units of intra-system roaming processor 60 according to a non-limiting, exemplary implementation embodiment. In addition to the previously mentioned intra-system roaming processor 60, FIG. 5 shows internet-based telephony system 20 as comprising one or more IP telephony system gateway(s) 70; IP telephony system Internet ports 72; and an IP telephony system database, which includes IP telephony system location register database 74. It should be kept in mind, however, that the internet-based telephony system 20 may be structured with different architectural units and functions in other implementations.

The IP telephony system gateway(s) 70 is/are configured to send or receive various signals or messages. For example, the IP telephony system gateway(s) 70 send the location update signal to the home location network; receive a roaming number request signal; and receive an incoming communication routing signal from the home location network, as herein described.

FIG. 5 further shows intra-system roaming processor 60 as comprising access monitor 76; connection unit 78; control unit 80; signal generator 82; signal handler 84; and location register manager or interface 86.

The access monitor 76 is configured to obtain certain information from the telephony device 30 when the telephony device has access to service to the internet-based telephony system 20. Such information obtained upon access to service includes a customer identifier for the customer and the International mobile Subscriber Identity IMSI of the telephony device 30. The customer identifier (CUST ID) may be a customer-selected user name or the like which is unique to the customer and agreed between the customer and telephony system 20. The customer may also have a password. Typically the customer identifier (CUST ID) and/or password are entered by the customer upon opening or activating an application of the telephony system 20 which is executed on the telephony device 30, e.g., a CoIP application 88. The IMSI is obtained from a mobile telephony device where it is stored in a Subscriber Identity Module (SIM) card, with each IMSI uniquely identifying the mobile telephony device, its home wireless network, and the home country of the home wireless network.

The signal generator 82 is adapted, when the telephony device 30 has access to service to the internet-based telephony system 20, to configure a location update signal to cause the home location network 32 for the customer to register the internet-based telephony system 20 as a network visited by a telephony device associated with the customer.

The signal handler 84 is configured, upon receipt of the roaming number request signal, to provide the home location network 32 with a roaming number. The roaming number is configured to cause the home location network 32 to route the incoming communication as an incoming communication routing signal to the internet-based telephony system 20.

The control unit 80 is configured to coordinate and sequence the actions of access monitor 76; connection unit 78; signal generator 82; signal handler 84; and location register manager or interface 86.

FIG. 5 also shows IP telephony system location register database 74 as comprising a record 90 for a particular customer of internet-based telephony system 20. The record 90 is shown as comprising plural fields or information elements, including customer ID (CUST ID) field 92; roaming number field 94; customer IP address(es) field 96 (CUST IP ADDR(ES)); Mobile Subscriber Integrated Services Digital Network Number (MSISDN) field 97; International mobile Subscriber Identity (IMSI) field 98; and, Home Location Register (HLR) field 99. It will be understood that IP telephony system location register database 74 contains, e.g., records such as record 90 for many customers of internet-based telephony system 20.

Regarding the fields of the record 90 for a particular customer, in many situations the customer IP address which is stored in customer IP address(es) field 96 (DEVICE IP ADDR(ES)) will be the IP address of the telephony device 30. But in other situations the customer may have one or more other IP addresses stored in IP address(es) field 96, either in lieu of or in addition to the IP address of the telephony device 30. For example, if the customer has invoke a call forwarding feature, the customer IP address(es) field 96 may include the IP address of one or more devices to which an incoming communication should be forwarded other than to telephony device 30. As another example, the customer may invoke a ring list feature or a multiple called device feature for which plural devices are notified, either sequentially or simultaneously, of an incoming communication. It should be understood that, in order to accommodate these situations and features, customer IP address(es) field 96 may include IP address(es) of one or more devices in addition to or instead of the IP address of telephony device 30.

Regarding the IP address of telephony device 30, which may be stored in customer IP address(es) field 96, the telephony system 20 may receive notifications (e.g., push notifications) or responses to inquires from the telephony device 30 regarding any changed IP address of the telephony device 30. A change of IP address may occur, for example, when the telephony device 30 changes networks. As mentioned above, the IMSI is obtained from a mobile telephony device where it is stored in a Subscriber Identity Module (SIM) card. The Mobile Subscriber Integrated Services Digital Network Number (MSISDN) is the number used for routing calls to the subscriber, e.g., the number normally dialed to connect a call to the mobile phone. A SIM card has a unique IMSI that does not change, while the MSISDN can change in time, i.e. different MSISDNs can be associated with the SIM.

FIG. 3 shows exemplary basic acts or steps which may comprise update signaling procedure 62 according to an exemplary embodiment and mode. It will be recalled that update signaling procedure 62 is performed by intra-system roaming processor 60 when a telephony device associated with a customer of the telephony system 20 has access to service of the internet-based telephony system. It will be recalled that obtaining access to the service of the internet-based telephony system 20 may occur in various ways. For example, one way of acquiring access is through access point 50, e.g., using an unlicensed frequency or an access point cell. Another way, illustrated in FIG. 1C, is through a PLMN type data connection when the telephony device 30 is in a macro cell with data connection handling capabilities.

Act 3-1 comprises obtaining information regarding the telephony device 30 that has gained access to the telephony system 20. In a basic exemplary embodiment and mode, act 3-1 comprises obtaining the customer identifier and IMSI of the telephony device 30 that has gained access to and therefore roamed into telephony system 20.

Act 3-2 comprises the internet-based telephony system 20 sending a location update signal to the public land mobile network 32 associated with the customer. The location update signal of act 3-2 is configured by internet-based telephony system 20 to cause the home location network, e.g., home public land mobile network 32, to register the internet-based telephony system 20 as a network visited by the telephony device 30 associated with the customer.

Figure 6:
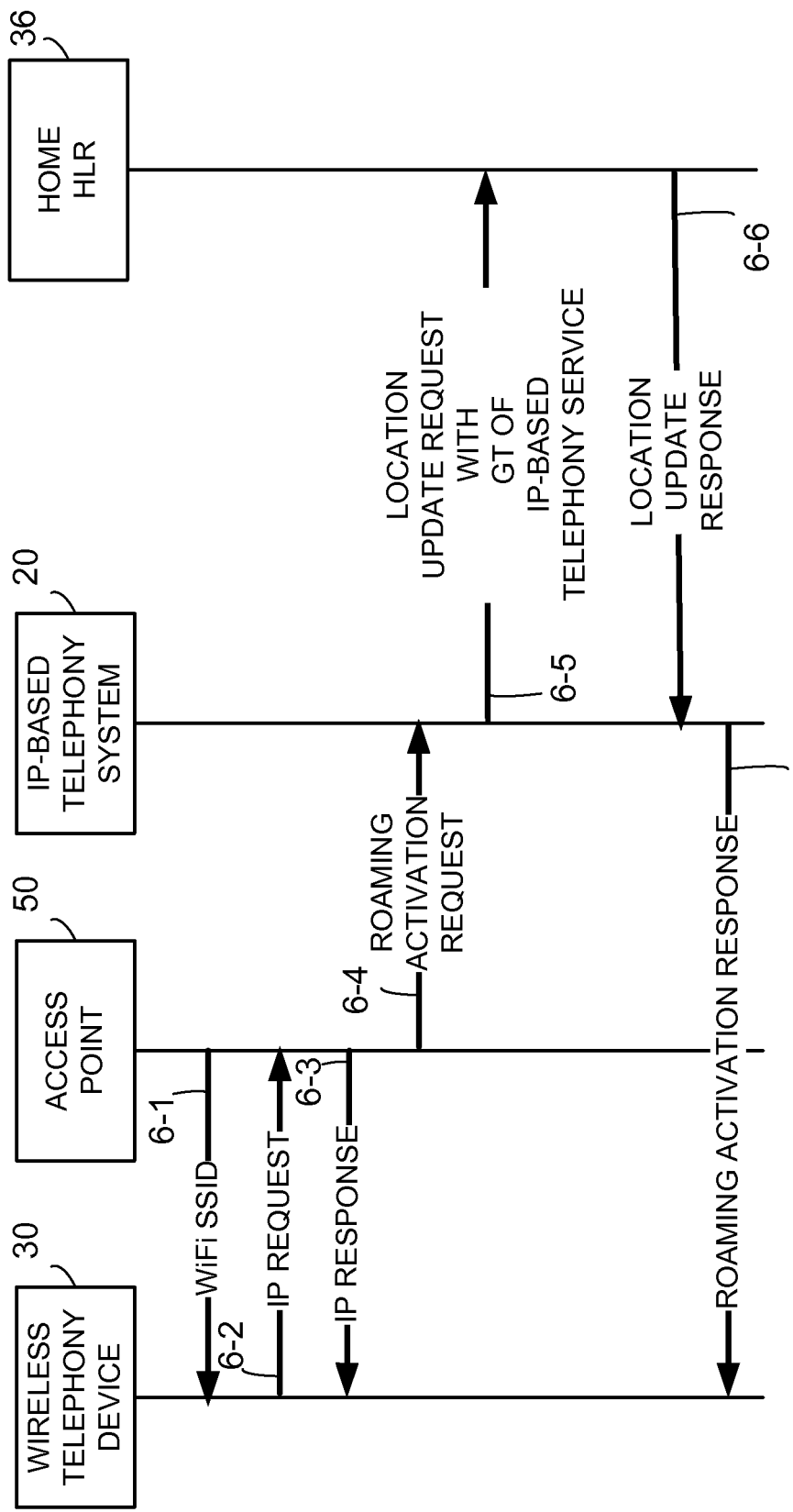
FIG. 6 is a diagrammatic view showing in more detail example acts and/or signals comprising or occurring in a context of a location registration operation performed in conjunction with intra-system roaming.

Acts of FIG. 3 may be understood in context of an exemplary scenario of events that include acts and signaling as depicted in FIG. 6. Act 6-1 comprises the telephony device 30 performing a network scanning operation to seek wireless coverage. In one exemplary embodiment and mode, the network scanning operation may result in obtaining an access point (e.g., WiFi) identifier, such as a service set identifier (SSID) of the access point 50. After obtaining the access point identifier, telephony device 30 sends an IP request message 6-2 to access point 50. If the IP request message 6-2 is successful, access point 50 returns an IP Response message 6-3 to telephony device 30. The foregoing explains how, when telephony device 30 is a wireless telephony device, it is determined when the telephony device is wirelessly connected for service to the internet-based telephony system, according to at least one exemplary embodiment and mode.

After obtaining Internet access, telephony device 30 sends a roaming activation request message 6-4 to intra-system roaming processor 60 of internet-based telephony system 20. The roaming activation request message 6-4 may include the customer identifier and the IMSI of the telephony device 30. In the intra-system roaming processor 60 of example embodiment of FIG. 5, the roaming activation request message 6-4 is received through IP telephony system Internet ports 72 and passed to access monitor 76 and control unit 80 of intra-system roaming processor 60. The intra-system roaming processor 60, having obtained the IMSI of the telephony device 30 which has gained access to 20, uses portions of the IMSI to determine where to send the location update signal. For example, the intra-system roaming processor 60 uses the country code (MCC) and operator code (MNC) of the IMSI to determine the PLMN 32 to which to send the location update signal.

The control unit 80 directs signal generator 82 to send location update request message 6-5 to PLMN home location register (HLR) 36 of the home public land mobile network 32 associated with the customer or account with which telephony device 30 is affiliated. Advantageously, location update request message 6-5 and other messages utilized herein may be configured in accordance with existing standards, e.g., GSM 09.02 standards, for example. In an example mode and embodiment, the location update signal of act 3-2 may be a GSM message "MAP-Location-Update" which is sent to the user's home location register (HLR) 36 in the user's home public land mobile network (PLMN) 32. The location update signal is received by a gateway 34, which forwards the location update signal to the appropriate HLR 36.

In addition, control unit 80 directs that record 90 for telephony device 30 in IP telephony system location register database 74 be updated so that roaming of telephony device 30 may be properly indicated in IP telephony system location register database 74. For example, control unit 80 notes appropriate information for the telephony device 30 which has just been granted access to the telephony system 20, and stores appropriate information for telephony device 30 in control unit 80. For example, control unit 80 directs that location register manager or interface 86 store in record 90 the customer identification information in customer number field 92 and the IMSI of the telephony device 30 in field 98. The control unit 80 may also obtain from other records of the customer the MSISDN of the telephony device 30 and store the MSISDN in field 97.

In the example embodiment of FIG. 5 location update request message 6-5 is sent through IP telephony system gateway(s) 70 and, in an exemplary embodiment and mode, is sent over a signaling system #7 (SS7) network to the customer's home public land mobile network (PLMN) 32. The location update request message 6-5 informs the PLMN home location register (HLR) 36 that the current location of telephony device 30 is in internet-based telephony system 20. In particular, the location update request message 6-5 provides PLMN home location register (HLR) 36 with the Global Title (GT) address of internet-based telephony system 20. In its memory PLMN home location register (HLR) 36 then pairs telephony device 30 with the Global Title (GT) of internet-based telephony system 20 so that, upon occurrence of any future incoming communication for telephony device 30, the PLMN home location register (HLR) 36 will be able to advise home public land mobile network 32 to direct the incoming communication to internet-based telephony system 20, as hereinafter explained. Thus, by sending to the PLMN home location register (HLR) 36 the Global Title (GT) address of internet-based telephony system 20, the internet-based telephony system 20 advises the home public land mobile network 32 that the telephony device 30 is roaming in another network—the network of the internet-based telephony system 20.

Upon completion of the storage of the Global Title (GT) address of internet-based telephony system 20, PLMN home location register (HLR) 36 sends location update response message 6-6 to intra-system roaming processor 60 of internet-based telephony system 20 to confirm that the location update has occurred. Upon receipt of location update response message 6-6, intra-system roaming processor 60 sends roaming activation response message 6-7 to telephony device 30. The foregoing illustrates how, in an exemplary embodiment and mode, the location update signal 6-5 enables the home location network to route the Map-Roaming-Number-Request (FIG. 7 Message '7-3') to a Global Title address of the internet-based telephony system 20.

In the example implementation of FIG. 5, the location update response message 6-6 may be received by signal handler 84, and notification of receipt of location update response message 6-6 is provided to control unit 80. The control unit 80 then directs access monitor 76 to send roaming activation response message 6-7 to telephony device 30. The roaming activation response message 6-7 is sent through IP telephony system Internet ports 72 and through Internet 24 to the customer device(s) associated with the IP address(es) as specified in IP ADDR(ES) field 96.

FIG. 4 shows exemplary basic acts or steps which may comprise incoming communication handling procedure 64 according to an exemplary embodiment and mode. Incoming communication handling procedure 64 is performed by intra-system roaming processor 60 upon occurrence of an incoming communication bearing a called party number associated with an account of the customer which includes the telephony device 30. As indicated above, the incoming communication may eventually be transmitted to telephony device 30 or, if another feature such as call forwarding or ring list is invoked, to other devices of the customer (as listed in CUST ADDR(ES) field 96) in addition to or in lieu of telephony device 30.

FIG. 4 shows basic acts performed subsequent to receipt an analysis of a call request which includes a called party number for the customer whose account includes the telephony device 30. Act 4-1 comprises providing the public land mobile network 32 associated with the customer with a roaming number that causes the public land mobile network 32 to route the incoming communication to internet-based telephony system 20. Act 4-2 comprises, upon receiving the incoming communication at the roaming number from the public land mobile network 32 associated with the customer, the internet-based telephony system 20 routing the communication through the Internet 24 to one or more customer device(s) that are associated with the called party number.

Figure 7:
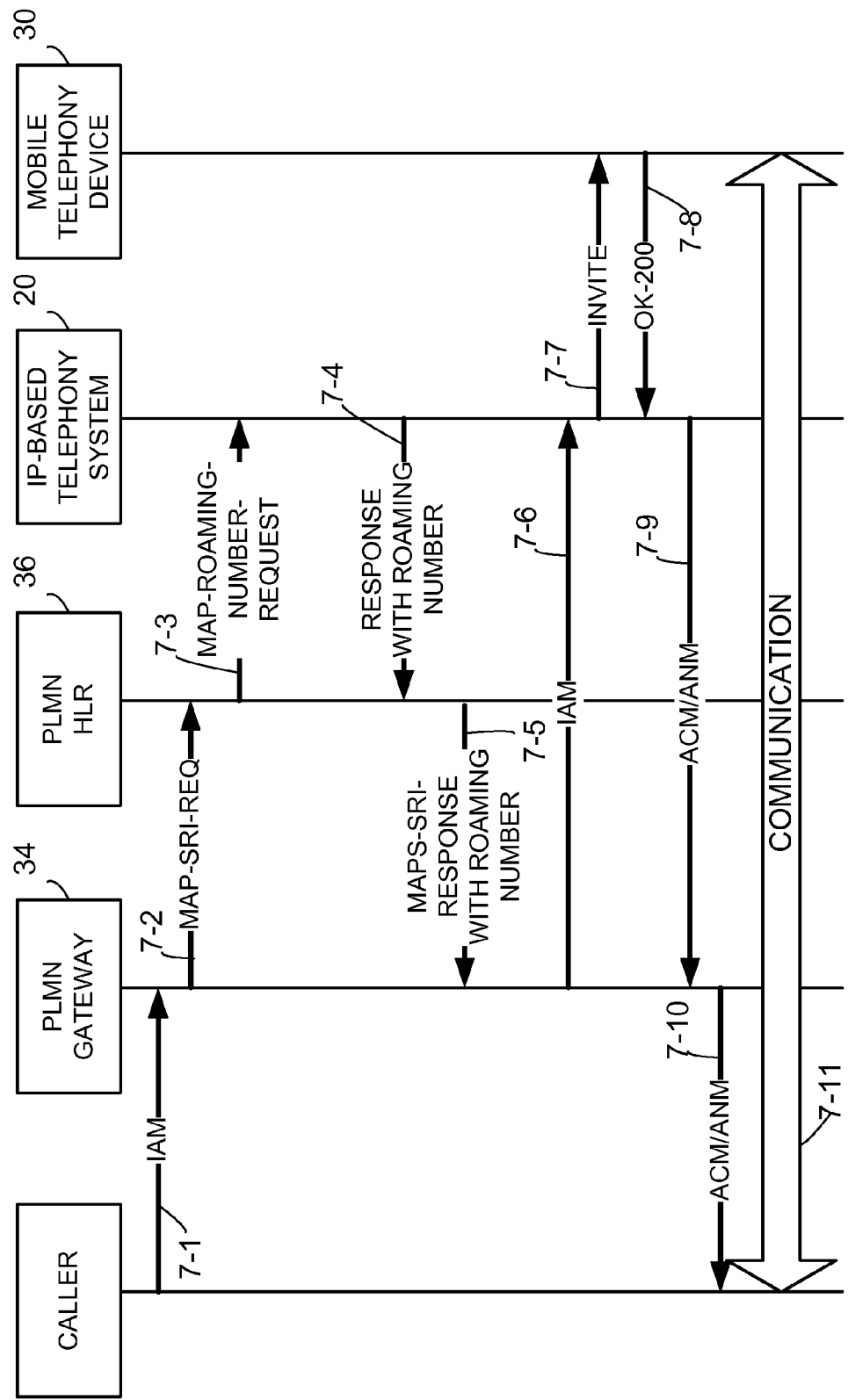
FIG. 7 is a diagrammatic view showing exemplary acts and/or signals comprising or occurring in a context of a communication connection operation performed in conjunction with intra-system roaming.

Acts of FIG. 4 may be understood in context of an exemplary scenario of events that include acts and signaling as depicted in FIG. 7. The incoming communication handling procedure 64 begins with a caller wishing to communicate with telephony device 30 sending an initial address message (IAM) 7-1 to telephony device 30. The initial address message (IAM) is typically the first message sent to inform a switch that a call has to be established, and includes, e.g., the called number (e.g., called party number), type of service (speech or data) and optional parameters. The initial address message (IAM) is ultimately sent (via various switches, if necessary) to PLMN gateway 34 (e.g., GMSC) of the home public land mobile network 32 for the customer associated with telephony device 30.

Upon receipt of IAM 7-1, PLMN gateway 34 invokes a Mobile Application Part (MAP) service package to send SendRoutingInformation (SRI) request message 7-2 to PLMN home location register (HLR) 36 of the customer's home public land mobile network 32. The SRI is a mobile application part (MAP) message sent by the gateway (GMSC) 34 to the HLR 36 to request routing information in order to route a call towards a mobile subscriber. As a result of the update signaling procedure 62 described above with reference to FIG. 3 and FIG. 6, the PLMN home location register (HLR) 36 has the Global Title of internet-based telephony system 20 stored as the location for devices of the called customer (which may include telephony device 30). Upon obtaining the Global Title (GT) of internet-based telephony system 20 as the location for telephony device 30, PLMN home location register (HLR) 36 in turn sends roaming number request message 7-3 to internet-based telephony system 20. The roaming number request message 7-3 may include a Global Title for the HLR 36 which sent the roaming number request message 7-3.

In the exemplary implementation of FIG. 5 the roaming number request message 7-3 is received through IP telephony system gateway(s) 70, handled by signal handler 84, and processed by control unit 80. The roaming number request message 7-3 may take the form of a standard GSM message, such as a MAP-PROVIDE-ROAMING-Number message and includes information that, e.g., enables control unit 80 to know for which telephony device 30 the incoming communication is addressed. For example, the roaming number request message 7-3 may include the Mobile Subscriber Integrated Services Digital Network Number (MSISDN) of the telephony device 30, the International mobile Subscriber Identity (IMSI) of the telephony device 30, and the Global Title (GT) of the internet-based telephony system 20. Receipt of the roaming number request message 7-3 enables location register manager or interface 86 to access the particular record 90 in IP telephony system location register database 74 that is associated with telephony device 30. The roaming number request message 7-3 may also include the Global Title for the HLR 36, which may be stored in HLR field 99 of record 90 in location register database 74.

Upon accessing the appropriate record 90 for telephony device 30, the location register manager or interface 86 returns to control unit 80 a roaming number from roaming number field 94 for telephony device 30. The roaming number may be permanently assigned to the telephony device 30 or it can be temporarily assigned, e.g., assigned to telephony device 30 as soon as there is a call (roaming number request) for it and then released upon finishing the call. The control unit 80 then prompts signal generator 82 to generate roaming number response message 7-4 that includes the roaming number for telephony device 30. The roaming number for telephony device 30 may also be stored in roaming number field 94 of the record 90. The telephony system 20 maintains a pool of roaming numbers, each roaming number being temporarily assigned to an incoming communication for the duration of the communication but thereafter returned to the pool for use in conjunction with another communication. The roaming number is also known as the "registration number" or "access number" for telephony device 30.

Upon obtaining the roaming number or access number for telephony device 30 from the roaming number response message 7-4, PLMN home location register (HLR) 36 sends SendRoutingInformation (SRI) response message 7-5 to the PLMN gateway 34. PLMN gateway 34 then sends initial address message (IAM) 7-6 for telephony device 30 to internet-based telephony system 20. The initial address message (IAM) 7-6 includes the roaming number or access number for telephony device 30 as obtained from intra-system roaming processor 60 of internet-based telephony system 20. The foregoing messages of FIG. 7 thus provide an understanding of how act 4-1, e.g., providing the public land mobile network 32 associated with the customer with a roaming number, is performed.

Upon receiving the initial address message (IAM) 7-6 with its roaming number or access number for telephony device 30, the internet-based telephony system 20 sends Invite message 7-7 through Internet 24 to the IP addresses of the one or more customer devices whose IP addresses may be listed in customer IP address(es) field 96. For sake of simplification, in the ensuing discussion it will be presumed that only the IP address of telephony device 30 is listed in customer IP address(es) field 96, although such may not be the case as explained previously. The Invite message is a Session Initiation Protocol (SIP) message that indicates a party is being invited to participate in a communication. The INVITE message may carry a Session Description Protocol (SDP) body with information regarding the media settings that the calling party supports/prefers e.g. codecs and media addresses. The internet-based telephony system 20 routes the Invite message 7-7 to the IP address(es) of whatever device(s) are listed in customer IP address(es) field 96. The internet-based telephony system 20 knows the IP address of telephony device 30 in view of receipt of the roaming number or access number for telephony device 30 provided in the initial address message (IAM) 7-6.

The Invite message 7-7 is received routed (through access point 50) to the IP address(es) in customer IP address(es) field 96, e.g., telephony device 30, to apprise the customer's addressed device(s) of the incoming communication. If customer's addressed device(s) accept(s) the incoming communication, the customer's addressed devic(es), e.g., telephony device 30, send(s) (through Internet 24) an OK-200 message 7-8 to internet-based telephony system 20. The OK 200 message 7-8 is a status code message that indicates that the Invite message 7-7 has succeeded. The "200 OK" SIP message is sent back to the calling party when the customer's addressed device(s) (e.g., telephony device 30) answers the communication, and usually contains a SDP body with the media settings that customer's addressed device(s) supports/prefers. In view of the success, internet-based telephony system 20 sends Address Complete Message/Answer Message (ACM/ANM) 7-9 to PLMN gateway 34. The PLMN gateway 34 thereafter relays Address Complete Message/Answer Message (ACM/ANM) 7-10 to the caller.

At this point communication may occur between the caller and customer's addressed device(s), e.g., telephony device 30. The communication is routed to and from the customer's addressed device(s) (e.g., telephony device 30) by internet-based telephony system 20, through Internet 24, and through access point 50 or the GPRS macro data network, using the IP address of customer's addressed device(s) and the IP address of telephony system 20. The routing of the communication through Internet 24 may be handled by connection unit 78 of internet-based telephony system 20. The foregoing thus illustrates an exemplary implementation of act 4-2, e.g., upon receiving the incoming communication at the roaming number from the public land mobile network 32 associated with the customer, the internet-based telephony system 20 routing the communication through the Internet 24 to the customer's addressed device(s), e.g., telephony device 30.

FIG. 7 thus describes routing of the incoming communication through the internet, ultimately to the customer's addressed device, for all kinds of data access connections, including wireless connection via WiFi/WiMAX or wireless connection via GPRS type data connection. Such routing is a link layer responsibility in the Transmission Control Protocol (TCP)/IP protocol stack.

Figure 8:
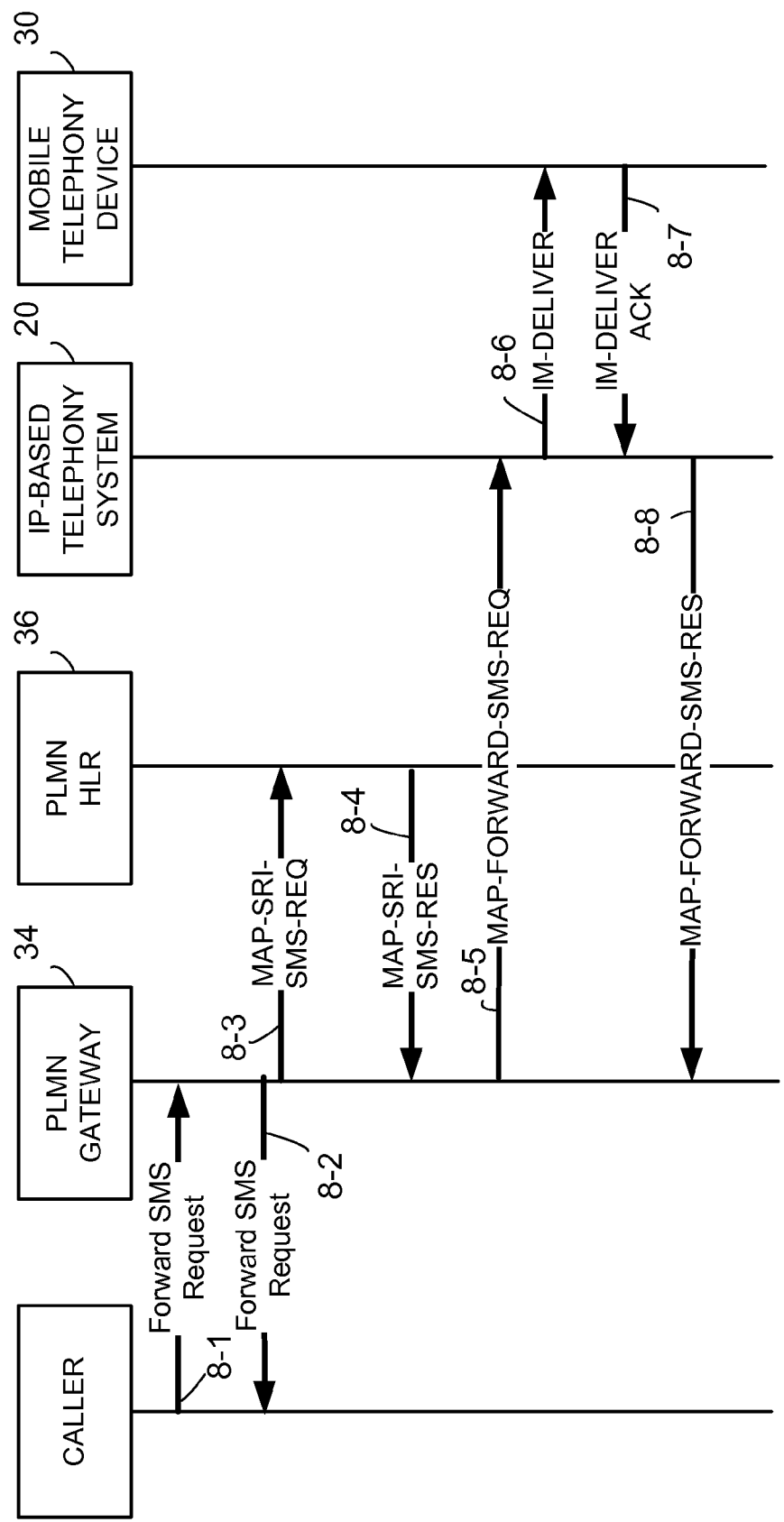
FIG. 8 is a diagrammatic view showing exemplary acts and/or signals comprising or occurring in a context of a short message service (SMS) communication connection operation performed in conjunction with intra-system roaming.

Whereas FIG. 7 illustrates signaling that may be appropriate for a generic communication, FIG. 8 shows signaling and acts that may be specialized for an incoming short message service (SMS) communication. The Short Message Service may be realized by the use of the Mobile Application Part (MAP) of the SS#7 protocol, with Short Message protocol elements being transported across the network as fields within the MAP messages.

The discussion and signaling of FIG. 8 presumes that the update signaling procedure 62 has already been successfully performed. FIG. 8 begins with a calling terminal, which may be a mobile station (MS), sending a Map-Forward-SMS-Request message 8-1, ultimately to PLMN gateway 34 of the home public land mobile network 32 for the called party number, e.g., the telephony device 30, to which the short message service (SMS) communication is intended. For a SMS communication the PLMN gateway may actually be a SMSC gateway. The Map-Forward-SMS-Request message 8-1 includes the text or content of the short message service (SMS) communication as well as the International mobile Subscriber Identity (IMSI) of the called terminal (e.g., telephony device 30) and possibly other information. Receipt of the Map-Forward-SMS-Request message 8-1 is acknowledged by a Map-Forward-SMS-Response message 8-2. After finalizing the receiving process including receipt of the Map-Forward-SMS-Request message 8-1, the PLMN gateway 34 sends a MAP-SRI-SMS-Request message 8-3 (MAP SEND_ROUTING_INFO_FOR_SMS) to PLMN home location register (HLR) 36 for telephony device 30 in order to request the present location of telephony device 30, e.g., for the addressed of the visited MSC. In view of previous performance of update signaling procedure 62, the PLMN home location register (HLR) 36 has associated the Global Title (GT) of internet-based telephony system 20 with internet-based telephony system 20, and therefore returns the Global Title (GT) of internet-based telephony system 20 in a MAP-SRI-SMS-Response message 8-5 to PLMN gateway 34.

Knowing the Global Title (GT) of internet-based telephony system 20 as the location of telephony device 30, PLMN gateway 34 sends a MAP-Forward-SMS-Request message 8-5 to internet-based telephony system 20 using SS#7 signaling. The MAP-Forward-SMS-Request message 8-5 includes the International mobile Subscriber Identity (IMSI) of the called telephony device 30 as well as the text or content of the short message service (SMS) communication. The MAP-Forward-SMS-Request message 8-5 may be received by IP telephony system gateway(s) 70 of internet-based telephony system 20, and particularly a gateway that handles short message service (SMS) communications. The incoming MAP-Forward-SMS-Request message 8-5 may be routed to control unit 80, which through location register manager or interface 86 accesses IP telephony system location register database 74 to obtain, from customer IP address(es) field 96, the IP address(es) of the customer's addressed device(s) associated with the telephony device 30 having the customer number, e.g., the International mobile Subscriber Identity (IMSI), included in the MAP-Forward-SMS-Request message 8-5.

Knowing the IP address of the telephony device 30 for which the short message service (SMS) communication is intended, internet-based telephony system 20 obtains the IP address(es) of the telephony device 30 or whatever other customer's addressed device(s) may be included in customer IP address(es) field 96 in addition or in lieu of the IP address of telephony device 30. The internet-based telephony system 20 sends IM-Deliver message 8-6 through Internet 24 (and either through access point 50 or a macro cell of a data network) to the IP address for customer's addressed device(s). In an exemplary embodiment and mode the access point 50 transmits the short message service (SMS) communication over the radio or air interface to telephony device 30. The IM-Deliver message 8-6 includes the content of the short message service (SMS) communication as authored by the calling terminal. Upon receipt of the short message service (SMS) communication as included in the IM-Deliver message 8-6, the telephony device 30 sends IM-Acknowledge message 8-7 through Internet 24 to internet-based telephony system 20. Thereafter internet-based telephony system 20 sends Map-Forward-SMS-Response message 8-8 to PLMN gateway 34.

The update signaling procedure 62 and incoming communication handling procedure 64 described above occur when telephony device 30 is within coverage of telephony system 20. As explained above, being within coverage of telephony system 20 may involve being with coverage of an access point 50, e.g., within access point cell 48, or being within coverage of a macro cell with data connection handling capability (e.g., a macro cell of a GPRS network). Since the telephony device 30 may be mobile or wireless, telephony device 30 may travel away from an access point 50 or a data-connection capable cell, and thus out of coverage of telephony system 20. Internet-Based telephony system 20 has a periodic checking mechanism (e.g., a watchdog method) to detect if the telephony device 30 loses its data connection (of either WiFi type or GPRS type) with internet-based telephony system 20.

Telephony device 30 may lose data coverage in either of two situations. In a first roam-out-of-coverage situation, the telephony device 30 roams back to a macro mobile (radio access network) network that does not have data-connection handling capability, e.g., a non-GPRS network. In such situation, the telephony device 30 will send a location update to its HLR 36, updating the most recent location as that of the macro RAN network. The HLR 36 will then send a MAP-Cancel-Location-req message to internet-based telephony system 20.

In a second roam-out-of-coverage situation there is no coverage at all, neither from the access cells nor any macro mobile (radio access network) network. In this second roam-out-of-coverage situation the communication will still transfer to internet-based telephony system 20. For a SMS communication the internet-based telephony system 20 tries to transfer the message to telephony device 30 (and/or devices for other customer's addressed device(s)) over Internet 24, but may eventually notice that the telephony device 30 is out-of-coverage. At that point the internet-based telephony system 20 replies to the SMSC gateway with an out-of-coverage message. For a call (e.g., voice call) situation the internet-based telephony system 20 may provide or play an out-of-coverage message and/or transfer the call to the subscriber's voice mail as maintained by internet-based telephony system 20.

The travel or movement of telephony device 30 may be toward a macro cell served by a radio access network (RAN) of a "visited" public land mobile network (PLMN) [in contrast to the home PLMN 32]. In some, but not all situations, the movement of the telephony device 30 may be away from access point cell 48, but in other situations the telephony device 30 may still be in coverage of an access point cell 48 as the telephony device 30 moves toward a new macro cell served by a radio access network.

Figure 9A:
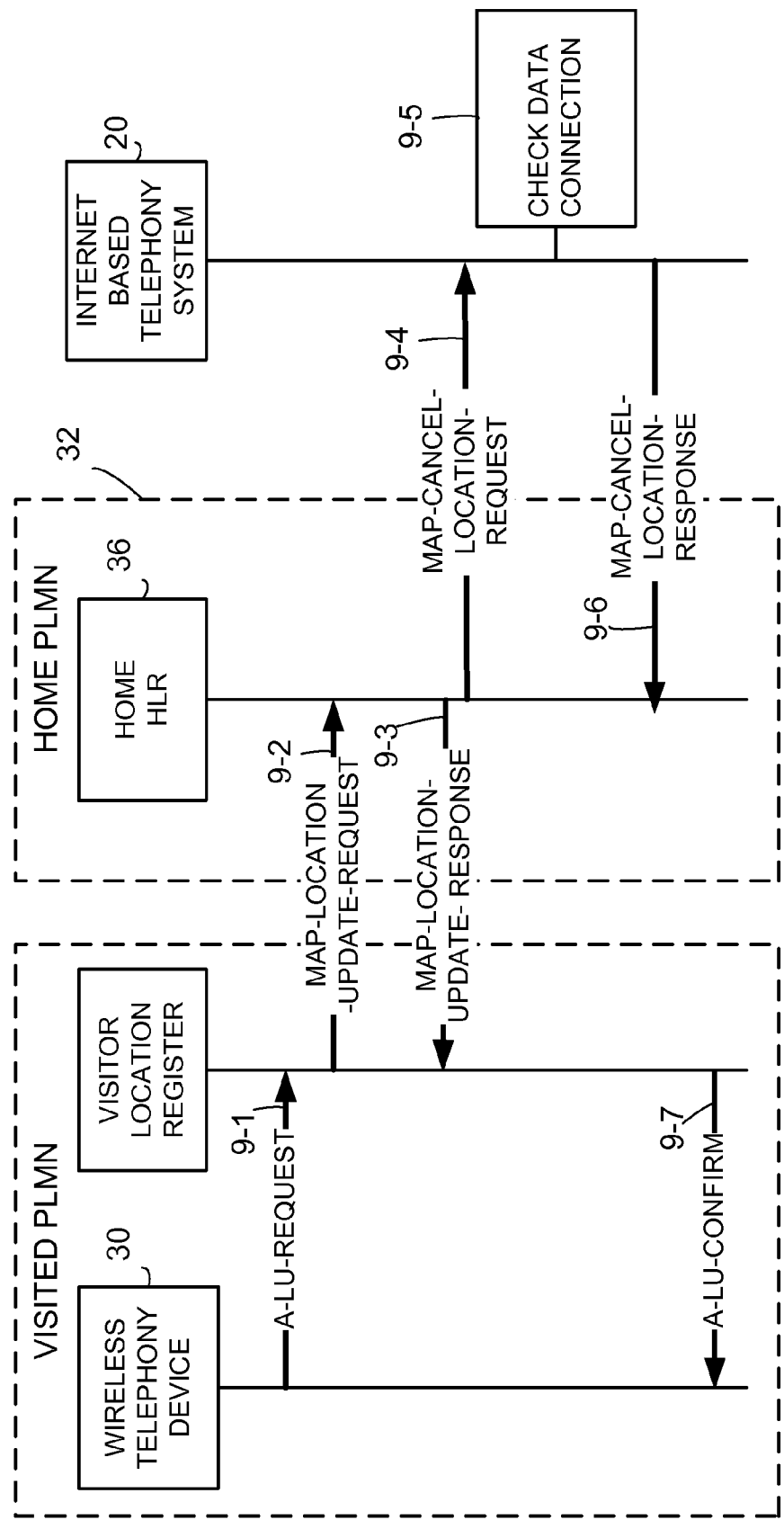
FIG. 9A and FIG. 9B are diagrammatic view showing exemplary acts and/or signals comprising or occurring in a context of differing scenarios of a location update for a visited PLMN when a telephony device moves to a macro cell.
Figure 9B:
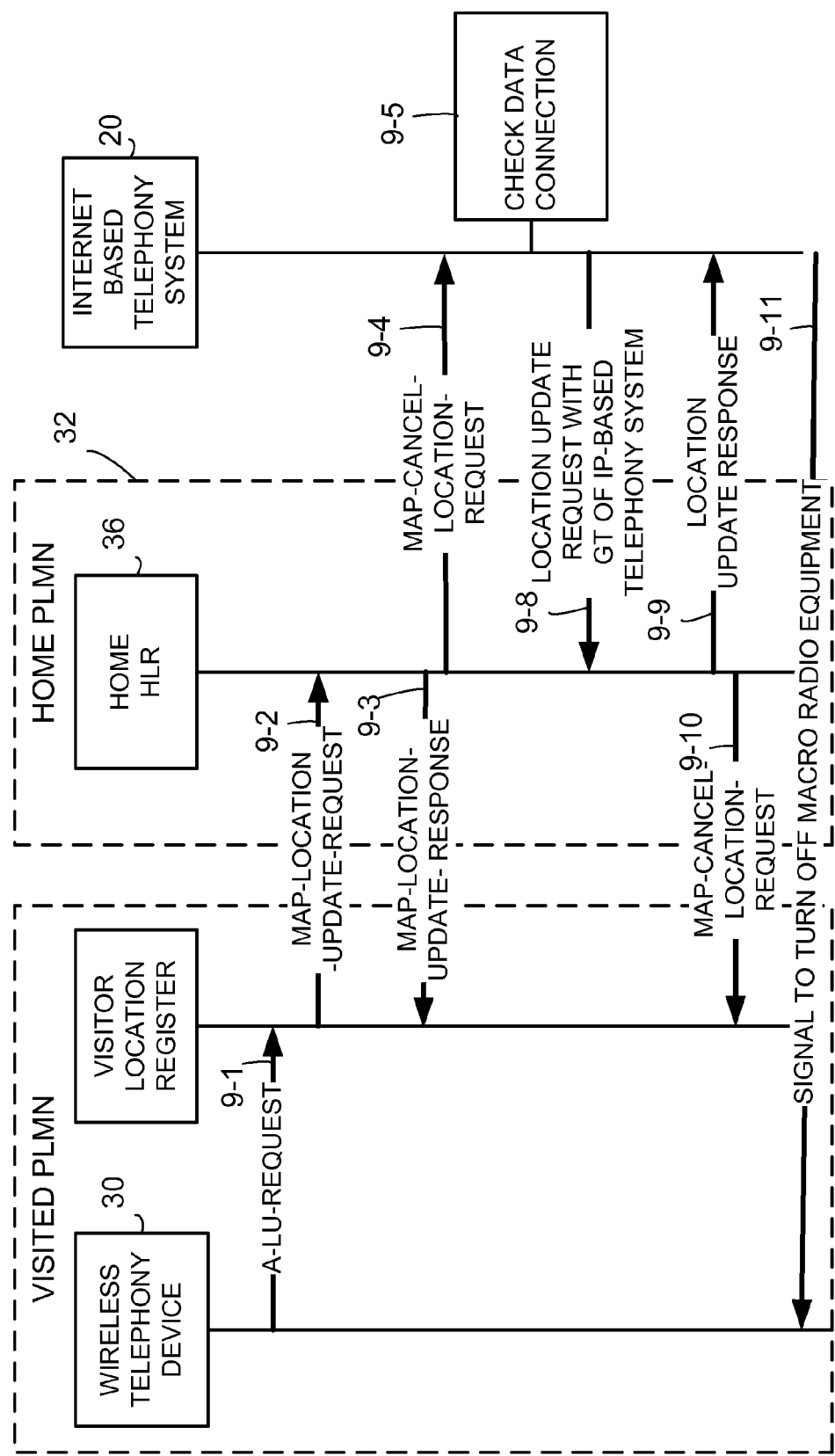

FIG. 9A and FIG. 9B illustrate exemplary acts and signaling involved in a potential location update respecting movement to a new macro cell having the visited PLMN. When detecting coverage of another PLMN, e.g., of a macro cell, for example, telephony device 30 sends a location update request message (A-LU-Req) 9-1 to a visitor location register (VLR) of the visited PLMN. The visitor location register (VLR) of the visited PLMN then sends location update request 9-2 (MAP-Location-Update-Request) to the PLMN home location register (HLR) 36 of home public land mobile network 32. In so doing, the PLMN home location register (HLR) 36 registers the visited PLMN as the current location of telephony device 30. Upon making such registration PLMN home location register (HLR) 36 sends location update response 9-3 (MAP-Location-Update-Response) to the VLR of the visited PLMN. In addition, PLMN home location register (HLR) 36 sends cancel location request message 9-4 (MAP-Cancel-Location-Request) to internet-based telephony system 20. The cancel location request message 9-4 may be particularly sent to internet-based telephony system 20, e.g., to a visitor location register (VLR) of internet-based telephony system 20. Upon receipt of the cancel location request message 9-4, the internet-based telephony system 20 may as act 9-6 check whether its data connection with telephony device 30 is still active, e.g., whether the data connection between internet-based telephony system 20 and telephony device 30 still exists.

FIG. 9A shows a scenario in which there is no longer a data connection between internet-based telephony system 20 and telephony device 30. As shown in FIG. 9A, if there is no longer a data connection between internet-based telephony system 20 and telephony device 30, internet-based telephony system 20 returns a cancel location response message 9-6 (MAP-Cancel-Location-Response) to PLMN home location register (HLR) 36. By about this time the VLR of the visited PLMN has sent a location update confirm message (A-LU-Confirm) 9-7 to telephony device 30.

FIG. 9B shows a scenario in which there still is a data connection between internet-based telephony system 20 and telephony device 30. As shown in FIG. 9B, if there still is a data connection between internet-based telephony system 20 and telephony device 30 as determined at act 9-6, as act 9-8 the internet-based telephony system 20 sends a location update request with the Global Title (GT) of the internet-based telephony system 20 to the PLMN home location register (HLR) 36 of the home public land mobile network 32 in order to cancel out or override the location update initiated by the macro radio access network. The PLMN home location register (HLR) 36 should then, in response, send a location update response message 9-9 back to internet-based telephony system 20, as understood, e.g., from FIG. 6. In addition, the PLMN home location register (HLR) 36 sends a MAP-CANCEL-LOCATION-REQUEST message back to the VLR as act 9-10. Yet further, as act 9-11 the internet-based telephony system 20 may send a signal over Internet 24 to telephony device 30 to instruct CoIP application 88 to turn off the portion of transceiver 110 that processes the macro radio communications (e.g., turn off the GSM part of the radio equipment of telephony device 30).

In at least some exemplary embodiments and modes the telephony device 30 is a wireless device and thus has mobility characteristics. As such, wireless terminal may roam in and out of "coverage" of the internet-based telephony system 20, or may roam between access points through which telephony device 30 is served by internet-based telephony system 20 and/or macro cells having data connection handling capability. Examples of such intra-system roaming have already been mentioned with respect to FIG. 1A, FIG. 1B, FIG. 1C, FIG. 1D, and FIG. 1E. FIG. 1B shows a situation in which telephony device 30 has roamed between access points that are located so that their cells at least partially overlap and facilitate essentially continuous service of (e.g., access to) internet-based telephony system 20 during the roaming. FIG. 1C shows a situation in which roaming of telephony device 30 between access point 50 and 50C is discontinuous in the sense of WiFi coverage, but nevertheless is still within coverage of telephony system 20 in view of the data connection handling capabilities of macro cell 46C. The travel along arrow 52E of FIG. 1E shows a discontinuous roaming with respect to internet-based telephony system 20, in view of the fact that along at least a portion of travel path 52E the telephony device 30 is not registered with internet-based telephony system 20 and may instead be served by a non-internet access provider, e.g., a radio access network of another carrier or network that does not have data connection handling capablity.

It should be understood that, upon roaming through telephony system 20, e.g., when within coverage of access point 50 of FIG. 1A, when within coverage of access point 50B of FIG. 1B, when within coverage of data connection capable macro cell 46C of FIG. 1C, and when within coverage of access point 50D of FIG. 1D, a new execution of update signaling procedure 62 need not occur. As used herein, "access" to telephony system 20 means access to telephony system 20 after having previously been outside of telephony system 20, and does not mean attachment to a different access point 50. Indeed, switching between different access points for data connection does not have any impact on the internet-based telephony system 20, other than possibly to update the IP address of the telephony device 30, e.g., in record 90 of location register database 74, when the IP address is changed.

Thus the telephony device 30 may travel or roam in a manner such as that depicted by FIG. 1A-FIG. 1E. In conjunction with such roaming internet-based telephony system 20 receives notifications at different access times as telephony device 30 makes or receives access to service to the internet-based telephony system 20. At each new access after the telephony device 30 has been out of access of telephony system 20 (such as when coming within coverage of access point 50E of FIG. 1E after being out of coverage of telephony system 20) the internet-based telephony system 20: (1) stores appropriate information regarding the telephony device 30 (e.g., customer number and IMSI); and (2) sends a location update signal (such as signal 6-5 of FIG. 6) to the public land mobile network 32 associated with the customer. As explained herein, the location update signal is configured by the telephony system to cause the home location network 32 to register the internet-based telephony system 20 as a network visited by the telephony device 30 associated with the customer. In particular, the location update signal may include the Global Title (GT) of internet-based telephony system 20 as an indication of current location of telephony device 30. Then, upon occurrence of an incoming communication directed a called number associated with a customer having an account with the internet-based telephony system which includes the telephony device 30, the internet-based telephony system 20: (3) provides the public land mobile network 32 associated with the customer with a roaming number that causes the public land mobile network associated with the customer to route the incoming communication to the internet-based telephony system 20; and (4) upon receiving the incoming communication at the roaming number from the public land mobile network 32 associated with the customer, routes the communication through the Internet 24 to an IP address for a device included in the customer account for the respective access time.

Figure 10:
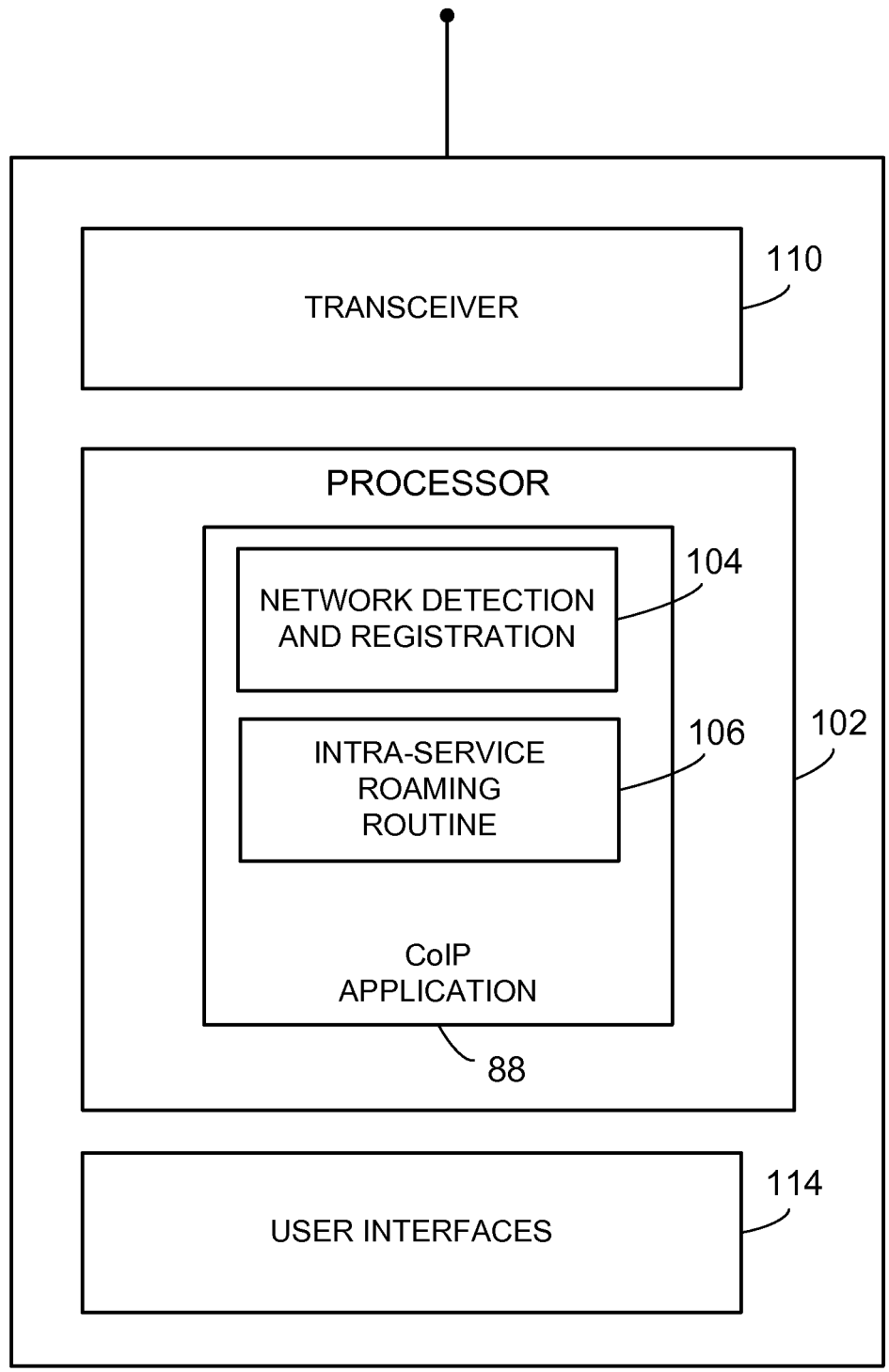
FIG. 10 is a schematic view of a wireless or mobile telephony device for which roaming is facilitated by an Internet-based telephony system which facilitates intra-system roaming.

FIG. 10 shows example, non-limiting functionalities and/or units of a wireless telephony device 30 according to an exemplary embodiment. The telephony device 30 includes IP telephony application 88 which is executed by one or more processor(s) 102. The IP telephony application 88 comprises several routines and functionalities, including network access detection and registration routine 104 described herein. As understood by those skilled in the art, processor(s) 102 may execute other applications as well, including those not specific to internet-based telephony system 20.

In addition, telephony device 30 comprises one or more transceivers 110, which may communicate wirelessly (e.g., across a radio or air interface) to send and receive communications. Using differing communication resources and by virtue of one or more antenna, the transceiver 110 may communicate with radio access network(s) (RANs) 42 with wireless internet-connected access points 50. The telephony device 30 also comprises various user interfaces 114, such as touchscreen, keypad, microphone, speaker, etc.

The network access detection and registration routine 104 is configured to comprise logic to facilitate and/or participate in the signaling described herein such as that of FIG. 6 through FIG. 9, for example. Coded instructions comprising network access detection and registration routine 104 may be stored on computer-readable non-transitory media. As such, the network access detection and registration routine 104 may comprise a computer program product.

Figure 11:
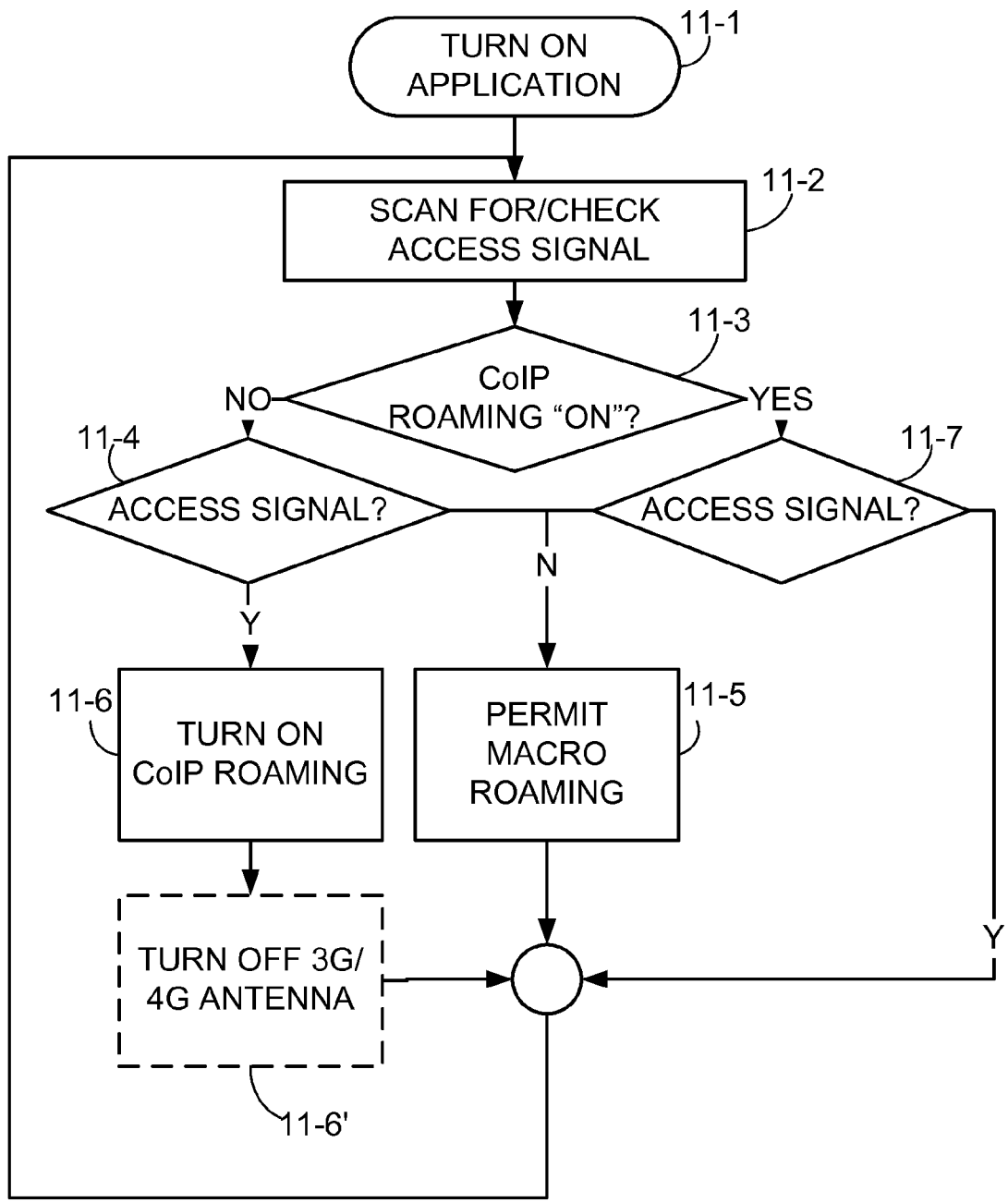
FIG. 11 is a flowchart showing exemplary basic acts or steps performed upon execution at a telephony device of a network access detection and registration routine according to an exemplary embodiment and mode.

Exemplary representative acts or steps performed upon execution by processor(s) 102 of the network access detection and registration routine 104 are shown in FIG. 11. Act 11-1 reflects turn on or initiation of network access detection and registration routine 104. Act 11-2 involves network access detection and registration routine 104, or transceivers 110 at the request of network access detection and registration routine 104, scanning for and checking whether telephony device 30 has or can obtain a signal to/with an internet-connected wireless access service, such as a WiFi or WiMAX access service or a broadcast signal (PBCCH) from a macro cell 46 which identifies the macro cell has having data-connection handling (e.g., GPRS) capability, for example.

Act 11-3 comprises checking whether an intra-service roaming feature (the CoIP roaming feature) is currently activated. If it is determined as act 11-3 that the intra-service roaming feature is not already activated, a decision is made as act 11-4 whether the signal of the internet-connected wireless access service was detected at act 11-2. Such "detection" may comprise, e.g., checking to ensure that there is a threshold level of wireless connectivity before implementing roaming. If the signal of the internet-connected wireless access service was not detected, then the CoIP roaming feature still cannot be used and the telephony device 30 is relegated or permitted to use of the macro radio access networks. That is, any roaming capabilities of the telephony device 30 are the roaming capabilities afforded by the GSM-type radio access networks, as reflected by act 11-5 of FIG. 11.

On the other hand, act 11-6 shows that the intra-service roaming feature, although not now activated, can be activated if the signal of the internet-connected wireless access service is detected. Activating the intra-service roaming feature, e.g., the CoIP roaming, comprises the telephony device 30 and particularly network access detection and registration routine 104 sending and receiving signals such as those illustrated and described for telephony device 30 with reference to FIG. 6 through and including FIG. 8.

As an optional act 11-6', the network access detection and registration routine 104 may turn off any antenna (e.g., 3G and/or 4G antenna) that would be used to send a location update message to any radio access network operator, e.g., to any network other than internet-based telephony system 20.

After the intra-service roaming feature is activated, the intra-service roaming feature stays activated until turned off by the user (e.g., de-activation of network access detection and registration routine 104) or until, after a return to act 11-2, it is determined that the signal of the internet-connected wireless access service is no longer or not detected.

If it is determined as act 11-3 that the intra-service roaming feature is already activated, a decision is made as act 11-7 whether the signal of the internet-connected wireless access service was detected at act 11-2. If the signal of the internet-connected wireless access service was not detected, then the CoIP roaming feature can no longer be used and the telephony device 30 may permit use of the macro radio access networks, as already discussed with reference to act 11-5 of FIG. 11.

On the other hand, if while the intra-service roaming feature is already activated and the signal of an internet-connected wireless access service still detected, the intra-service roaming feature stays activated. A check may be made, however, as act 11-8, that the telephony device 30 is still connected to the same access point 50. This check may be performed by internet-based telephony system 20 on a periodic basis, or by the CoIP application 88. If the check of act 11-7 is positive, the telephony device 30 continues its CoIP roaming within telephony system 20, either through the same or a different access point 50. Thus, upon a positive determination of act 11-7 execution of network access detection and registration routine 104 loops back to act 11-2 to continue to monitor for a signal of an internet-connected wireless access service.

Figure 12:
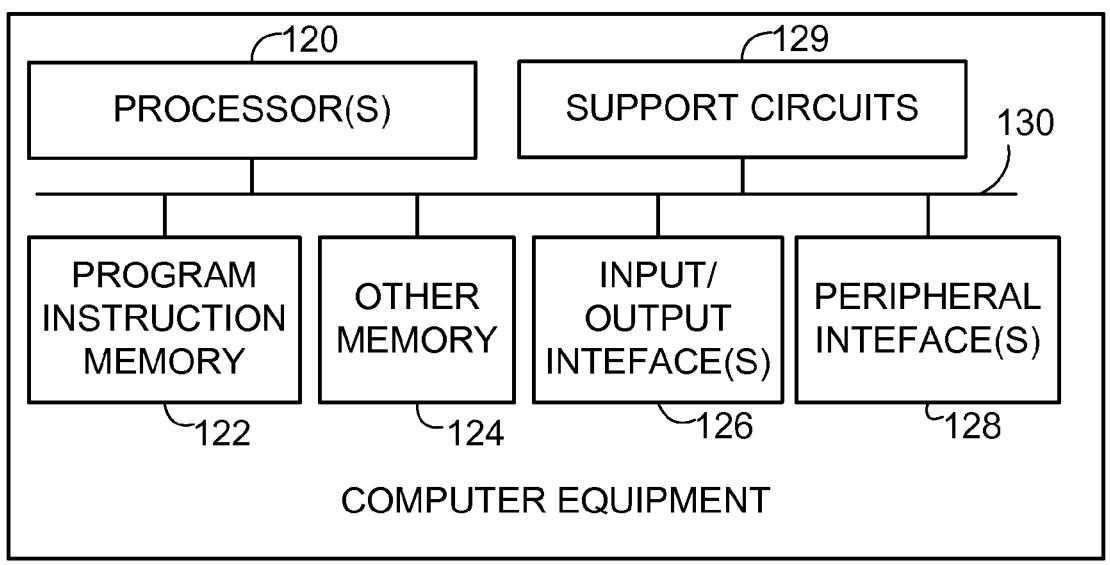
FIG. 12 is a schematic view shows an example of machine hardware comprising one or more processors for implementing aspects of an IP telephony system and a telephony device according to exemplary embodiments.

Various functions described herein, including functions of intra-system roaming processor 60 of internet-based telephony system 20 and IP telephony application 88 (including network access detection and registration routine 104) of telephony device 30, may, at least in some embodiments and modes, be performed by machine hardware. FIG. 12 shows an example of such machine hardware as comprising one or more processors 120, program instruction memory 122; other memory 124 (e.g., RAM, cache, etc.); input/output interfaces 126; peripheral interfaces 128; support circuits 129; and busses 130 for communication between the aforementioned units.

The memory 124, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 129 are coupled to the processors 120 for supporting the processor in a conventional manner. These circuits include cache, power supplies, clock circuits, input/output circuitry and subsystems, and the like.

Software routines such as software for intra-system roaming or CoIP roaming of telephony system 20 and the software (e.g., IP telephony application 88 and its network access detection and registration routine 104) for the telephony device 30 are executed by processor(s) 60 of the internet-based telephony system 20 and processor(s) 102 of telephony device 30, respectively. For the machine hardware of each intra-system roaming processor 60 and telephony device 30 such software may be stored on non-transient memory such as program instruction memory 122. Also, the software routines could also be stored remotely from the CPU, e.g., remotely from processors 120. For example, the software could be resident on servers and memory devices that are located remotely from the CPU, but which are accessible to the CPU via a data network connection. Such software, when executed by processors 120, transforms the general purpose computer into a specific purpose computer that performs one or more functions of the IP telephony system 20. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The technology disclosed herein has many advantages. A non-exhaustive listing of such advantages includes:

Reducing the roaming costs of a subscriber/customer by increasing utilization of internet-based telephony system 20. Such advantage is enhanced by an automatic switch to internet-based telephony system 20 as soon as coverage from an internet-connected access point is detected and connected thereto made.

Simplification of roaming implementation, in many cases without subscriber/customer interaction. For example, the CoIP roaming may be implemented without a customer/subscriber having to use of even see a "Call-Forward" or "Roam" icon on telephony device 30.

Maximum reachability of a subscriber/customer through internet-based telephony system 20, as facilitated by an automatic switch between CoIP roaming and GSM-type roaming.

Minimizing subscriber/customer dependence on radio access network (e.g., GSM type) operators.

Avoiding use of any permanent or fixed access number for a telephony device.

Forwarding any type of internet-transmissible communications to the telephony device, including but not limited to voice and short message service (SMS) communications.

Affording network or service operators an opportunity to improve coverage.

In the above regard, an operator which generally transmits communications without use of a data connection may enhance its service and/or coverage if provided with ability to use a data connection. For example, when a user is at home and his telephony device 30 has a data connection (e.g., to Internet 24), the operator can send all of the user's communications to his telephony device 30 via the data connection. Moreover, in case the operator has a coverage problem in some area, the operator can still use the technology disclosed herein and send communications thorugh the data network to deliver a high quality service to the subscriber.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating an internet-based telephony system comprising:
    determining that a telephony device associated with a customer of the internet-based telephony system has access to service of the internet-based telephony system;
    sending a location update signal to a public land mobile network associated with the customer, the location update signal including an identification of the internet-based telephony system as a network visited by the telephony device associated with the customer;
    upon the internet-based telephony system receiving from the public land mobile network an indication of an incoming communication directed to a called number associated with an account of the customer which includes the telephony device, the internet-based telephony system:
        providing the public land mobile network with a roaming number;
        upon receiving the incoming communication and the roaming number from the public land mobile network, routing the communication through the Internet to a device included in the customer account.

2. The method of claim 1, wherein the device included in the customer account is the telephony device.

3. The method of claim 1, wherein the device included in the customer account is a device other than the telephony device.

4. The method of claim 1, further comprising sending the location update signal to a home location register of the public land mobile network associated with the customer, the location update signal being configured by the telephony system to include information that enables the home location register of the home location network to register the internet-based telephony system as the network visited by the telephony device associated with the customer.

5. The method of claim 1, wherein the telephony device is a wireless telephony device, and further comprising determining when the telephony device is wirelessly connected for service to the internet-based telephony system.

6. The method of claim 5, further comprising determining when the telephony device is wirelessly connected through a WiFi access point for service to the internet-based telephony system.

7. The method of claim 5, further comprising determining when the telephony device is wirelessly connected through a data-connection handling macro network for service to the internet-based telephony system.

8. The method of claim 1, further comprising configuring the location update signal to include a Global Title address of the internet-based telephony system.

9. The method of claim 1, further comprising configuring and sending the location update signal in accordance with GSM 09.02 standards.

10. The method of claim 1, wherein the incoming communication is one of an incoming voice call or a short message service communication.

11. An internet-based telephony system comprising a processor configured to:
    (1) generate a non-transitory location update signal to send to a home location network when the telephony device has access to a service of the internet-based telephony system, the location update signal including an identification of the internet-based telephony system as a non-home location network visited by a mobile telephony device associated with an account of a customer of the internet-based telephony system; and,
    (2) route the incoming communication through the Internet to a device included in the account for the customer when, as a result of the location update signal, the home location network directs an incoming communication for a called number associated with the account for the customer to the internet-based telephony system.

12. The internet-based telephony system of claim 11, comprising:
    an access monitor configured to obtain information for the telephony device associated with the customer when the telephony device has access to service to the internet-based telephony system;
    a signal generator adapted, when the telephony device has access to service of the internet-based telephony system, to configure the location update signal to cause the home location network for the customer to register the internet-based telephony system as a network visited by the telephony device;
    a gateway configured to send the location update signal to the home location network and to receive a non-transitory roaming number request signal and a non-transitory incoming communication routing signal from the home location network;
    a signal handler configured, upon receipt of the roaming number request signal, to provide the home location network with a roaming number configured to cause the home location network to route the incoming communication as the incoming communication routing signal to the internet-based telephony system; and
    a communication connection unit configured, upon receipt of the incoming communication routing signal, to route the communication through the Internet to the device included in the account for the customer.

13. The internet-based telephony system of claim 12, wherein the device included in the account for the customer is the telephony device.

14. The internet-based telephony system of claim 12, wherein the device included in the account for the customer is a device other than the telephony device.

15. The internet-based telephony system of claim 12, further comprising a location register database configured to store the roaming number and the IP address for the telephony device.

16. The internet-based telephony system of claim 12, further comprising a location register database configured to store the IP address(es) for one or more telephony devices included in the account for the customer.

17. The system of claim 11, wherein the processor is configured to generate the location update signal to include a Global Title address of the internet-based telephony system.

18. The system of claim 11, wherein the incoming communication is one of an incoming voice call and a short message service communication.

19. An internet-based Internet Protocol telephony system comprising a processor configured to:
    determine that a telephony device associated with a customer of the internet-based telephony system has access to service of the internet-based telephony system;
    send a location update signal to a public land mobile network associated with the customer, the location update signal including an identification of the internet-based telephony system as a network visited by the telephony device associated with the customer;
provide the public land mobile network with a roaming number upon the internet-based telephony system receiving from the public land mobile network an indication of an incoming communication directed to a called number associated with an account of the customer which includes the telephony device;
route the communication through the Internet to a device included in the customer account upon receiving the incoming communication and the roaming number from the public land mobile network.

\* \* \* \* \*